(12) United States Patent
Abe et al.

(10) Patent No.: US 10,708,535 B2
(45) Date of Patent: Jul. 7, 2020

(54) LIGHT OUTPUT SYSTEM

(71) Applicant: SHARP KABUSHIKI KAISHA, Sakai, Osaka (JP)

(72) Inventors: Hiroki Abe, Sakai (JP); Hideki Nishimura, Sakai (JP); Shusaku Mizukami, Sakai (JP); Hironori Inoue, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/326,876

(22) PCT Filed: Mar. 9, 2017

(86) PCT No.: PCT/JP2017/009437
§ 371 (c)(1),
(2) Date: Feb. 20, 2019

(87) PCT Pub. No.: WO2018/078904
PCT Pub. Date: May 3, 2018

(65) Prior Publication Data
US 2019/0199958 A1     Jun. 27, 2019

(30) Foreign Application Priority Data

Oct. 31, 2016 (JP) .................. 2016-212931

(51) Int. Cl.
| | | |
|---|---|---|
| H04N 5/57 | (2006.01) |
| G09G 5/14 | (2006.01) |
| H04N 21/488 | (2011.01) |
| G09G 3/34 | (2006.01) |
| H04N 5/64 | (2006.01) |
| H04N 21/45 | (2011.01) |
| H04N 21/422 | (2011.01) |
| H04N 21/462 | (2011.01) |
| G09G 5/00 | (2006.01) |
| G06F 3/147 | (2006.01) |
| G09G 3/20 | (2006.01) |

(Continued)

(52) U.S. Cl.
CPC ............... *H04N 5/57* (2013.01); *G06F 3/147* (2013.01); *G09G 3/20* (2013.01); *G09G 3/3406* (2013.01); *G09G 5/00* (2013.01); *G09G 5/14* (2013.01); *H04N 5/60* (2013.01); *H04N 5/64* (2013.01); *H04N 21/4131* (2013.01); *H04N 21/42202* (2013.01); *H04N 21/4394* (2013.01); *H04N 21/4532* (2013.01); *H04N 21/4622* (2013.01); *H04N 21/4882* (2013.01); *H04N 21/4886* (2013.01); *H04R 1/028* (2013.01); *H05B 47/12* (2020.01); *G09G 2354/00* (2013.01);

(Continued)

(58) Field of Classification Search
None
See application file for complete search history.

(56) References Cited

U.S. PATENT DOCUMENTS

2007/0233905 A1    10/2007  Hatano et al.
2009/0310021 A1    12/2009  Kondo et al.
(Continued)

FOREIGN PATENT DOCUMENTS

| JP | H04-087480 A | 3/1992 |
| JP | H07-046565 A | 2/1995 |

(Continued)

*Primary Examiner* — Samira Monshi
(74) *Attorney, Agent, or Firm* — ScienBiziP, P.C.

(57) ABSTRACT

There is provided a light output system (100) including a speaker (170), a light output unit (135, 130), and a processor 110 to cause first audio and second audio to be output from the speaker (170) and cause the light output unit (135, 130) to output light corresponding to the second audio output.

11 Claims, 44 Drawing Sheets

(51) Int. Cl.
*H04N 21/439* (2011.01)
*H04N 21/41* (2011.01)
*H05B 47/12* (2020.01)
*H04N 5/60* (2006.01)
*H04R 1/02* (2006.01)
*H04N 5/66* (2006.01)
*H05B 45/10* (2020.01)
*H05B 45/20* (2020.01)

(52) U.S. Cl.
CPC ............ *H04N 5/66* (2013.01); *H04R 2499/15* (2013.01); *H05B 45/10* (2020.01); *H05B 45/20* (2020.01)

(56) References Cited

U.S. PATENT DOCUMENTS

| | | | |
|---|---|---|---|
| 2010/0277762 A1* | 11/2010 | Eguchi | G03G 15/5016 358/1.15 |
| 2013/0163952 A1* | 6/2013 | Ni | H04N 21/8106 386/230 |
| 2014/0361968 A1 | 12/2014 | Kondo | |
| 2015/0002380 A1 | 1/2015 | Kondo et al. | |
| 2015/0215565 A1 | 7/2015 | Kondo et al. | |
| 2015/0312514 A1 | 10/2015 | Kondo et al. | |

FOREIGN PATENT DOCUMENTS

| | | |
|---|---|---|
| JP | H07-210125 A | 8/1995 |
| JP | 2005-269255 A | 9/2005 |
| JP | 2006-135841 A | 5/2006 |
| JP | 2006-229498 A | 8/2006 |
| JP | 2007-300452 A | 11/2007 |
| JP | 2010-021991 A | 1/2010 |
| JP | 2010-081220 A | 4/2010 |
| JP | 2010-262105 A | 11/2010 |
| JP | 2015-015665 A | 1/2015 |
| WO | 2006/046357 A1 | 5/2006 |
| WO | 2013/099630 A1 | 7/2013 |
| WO | 2013/099631 A1 | 7/2013 |
| WO | 2013/099632 A1 | 7/2013 |
| WO | 2013/099633 A1 | 7/2013 |

* cited by examiner

FIG. 11

| SOUND VOLUME LEVEL | FIRST TIME | SECOND TIME | THIRD TIME | FOURTH TIME |
|---|---|---|---|---|
| SOUND VOLUME | SMALL | MEDIUM | MEDIUM | LARGE |
| INTENSITY | WEAK | MEDIUM | MEDIUM | STRONG |
| COLOR (LUMINANCE) | BLUE | GREEN | YELLOW | RED |
| TEMPO | SLOW | NORMAL | NORMAL | FAST |

FIG. 12

| NOTIFICATION ID | AUDIO DATA | FIRST-TIME FLAG | SECOND-TIME FLAG | THIRD-TIME FLAG |
|---|---|---|---|---|
| ⋮ | ⋮ | ⋮ | ⋮ | ⋮ |

FIG. 13

```
        START
          │
          ▼          S102
  ANALYZE AUDIO DATA
          │
          ▼          S103
  SPECIFY NUMBER OF TIMES
       OF OUTPUT
          │
          ▼          S104
  CREATE LIGHT OUTPUT DATA
          │
          ▼          S106
     OUTPUT LIGHT
          │
          ▼
         END
```

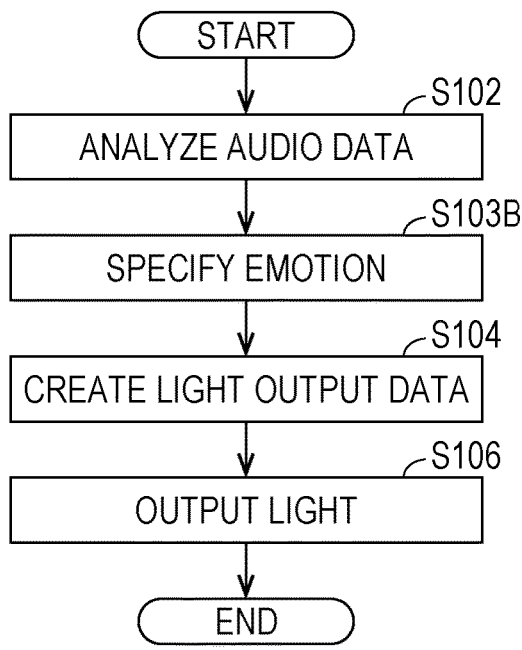

FIG. 18
(A)   CAUTION LEVEL = YELLOW
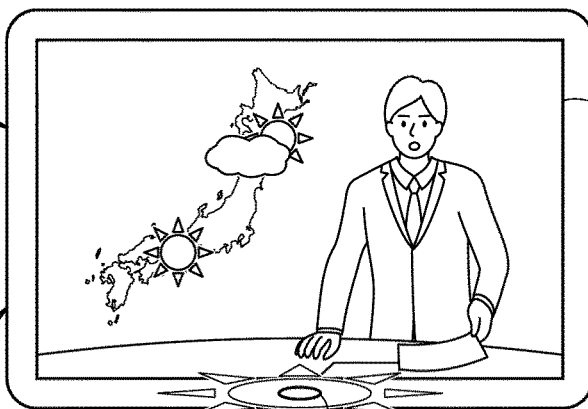
(B)   WARNING LEVEL = RED
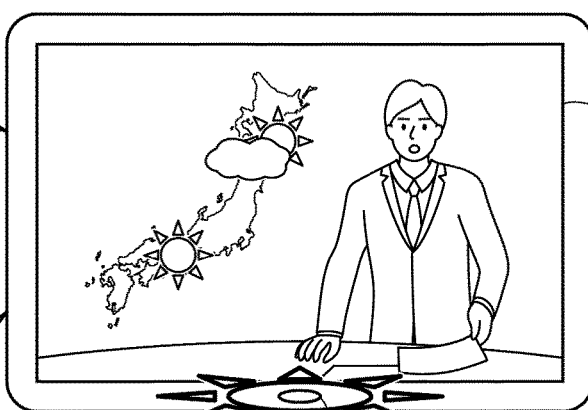
FIG. 19
| DEGREE OF URGENCY | PERSONALITY | COLOR OF LIGHT | TEMPO OF LIGHT | INTENSITY OF LIGHT |
|---|---|---|---|---|
| ⋮ | ⋮ | ⋮ | ⋮ | ⋮ |

FIG. 21
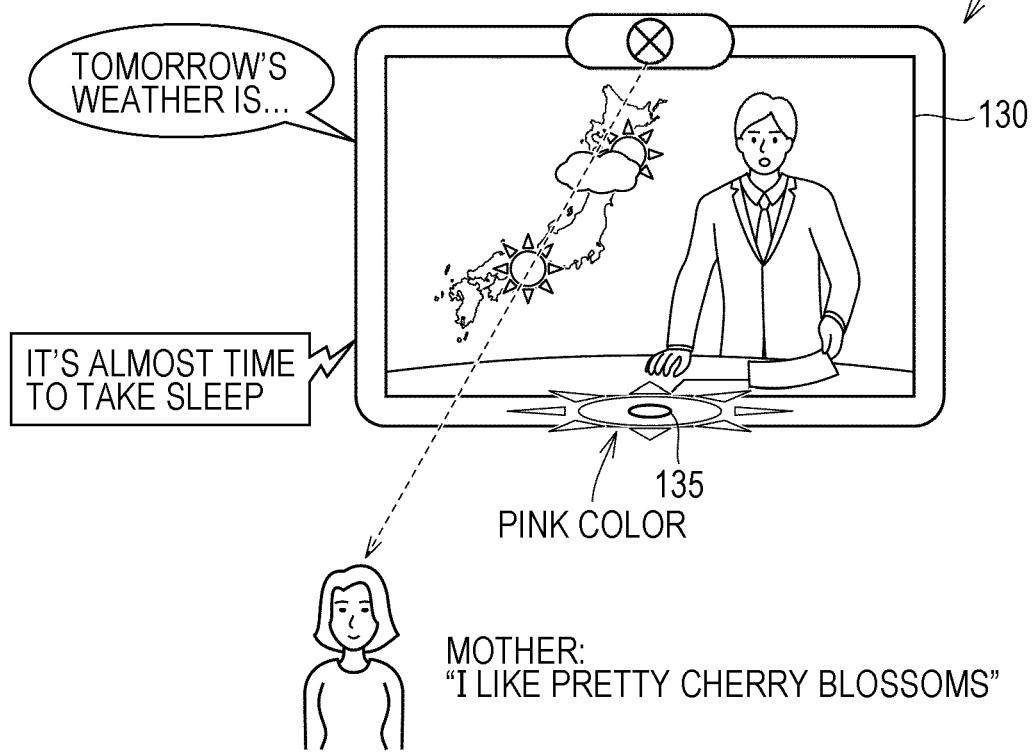
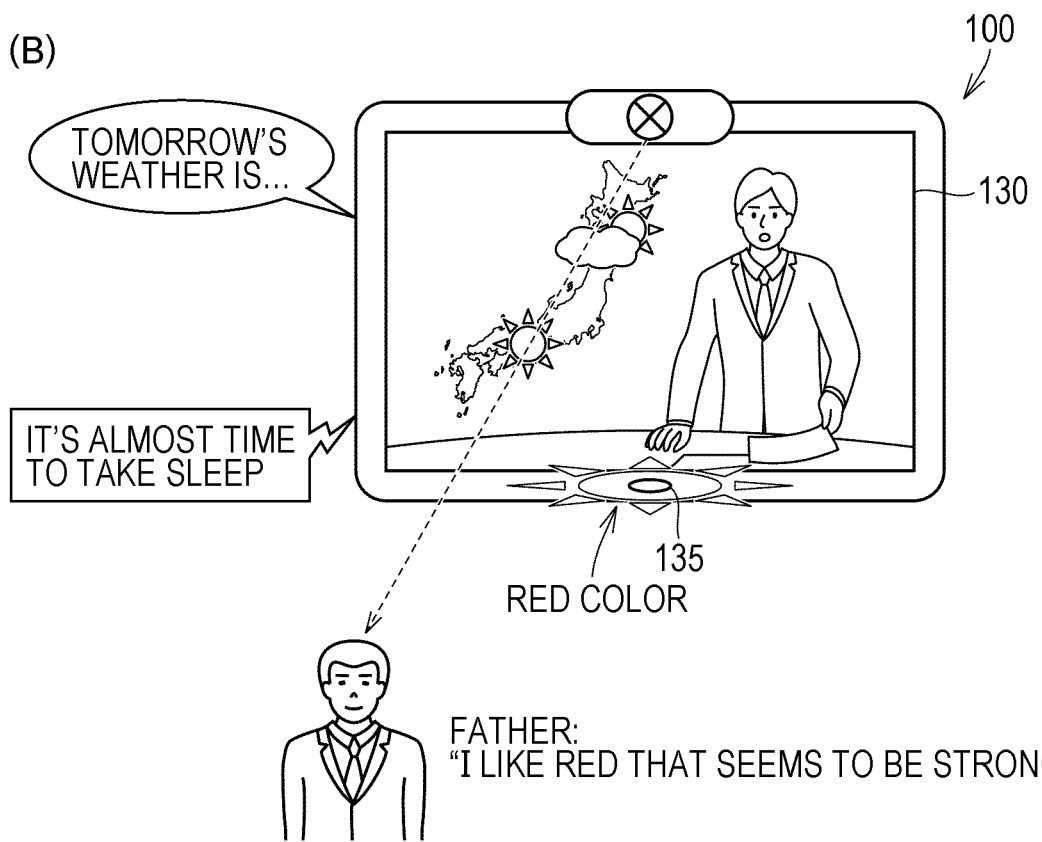

FIG. 22
| USER ID | FEATURE DATA | PERSONALITY | COLOR OF LIGHT | TEMPO OF LIGHT | INTENSITY OF LIGHT |
|---------|--------------|-------------|----------------|----------------|--------------------|
| ⋮ | ⋮ | ⋮ | ⋮ | ⋮ | ⋮ |
126
FIG. 23
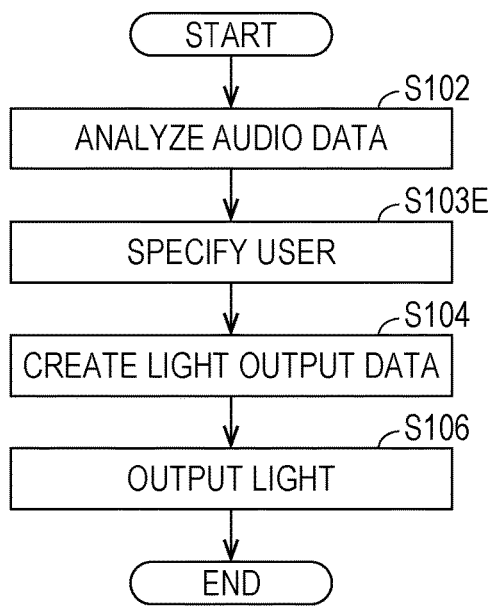
FIG. 24
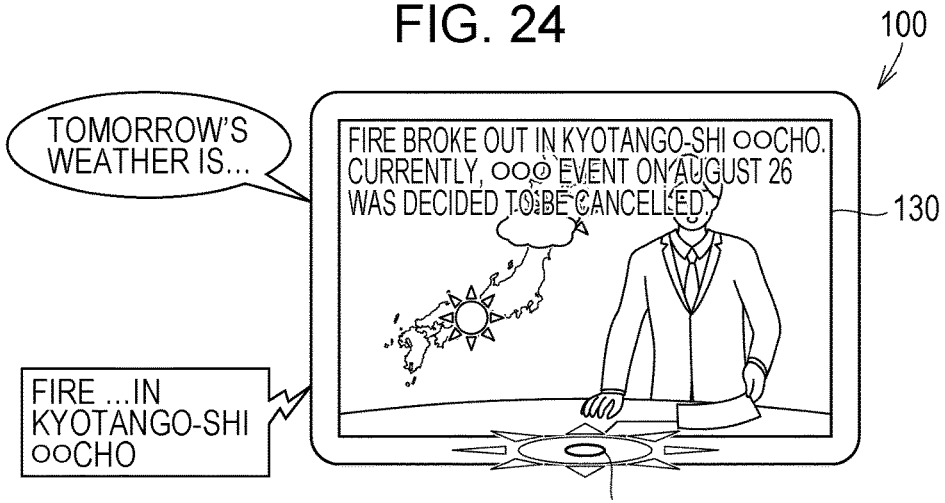

| THEME (GENRE) | PERSONALITY | COLOR OF LIGHT | TEMPO OF LIGHT | INTENSITY OF LIGHT |
|---|---|---|---|---|
| ⋮ | ⋮ | ⋮ | ⋮ | ⋮ |

FIG. 32
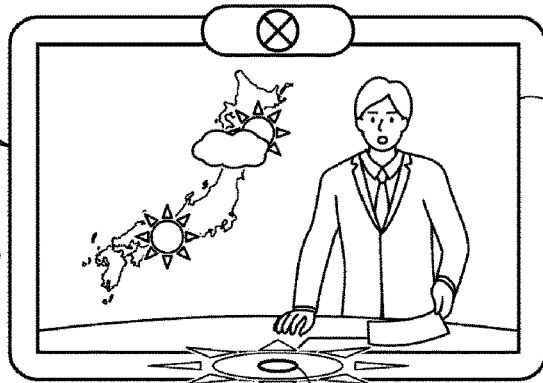
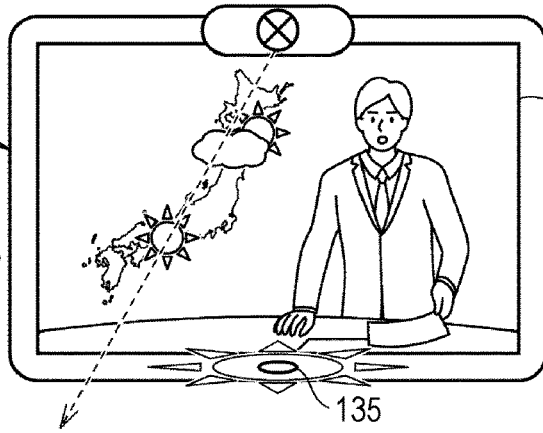
DETECTION BY CAMERA
JUDGE TO HEAR IT.
(IT MAY BE INSTRUCTED BY GESTURE)
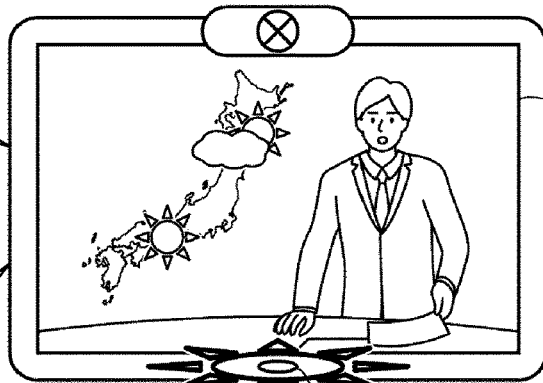

FIG. 39
(A)
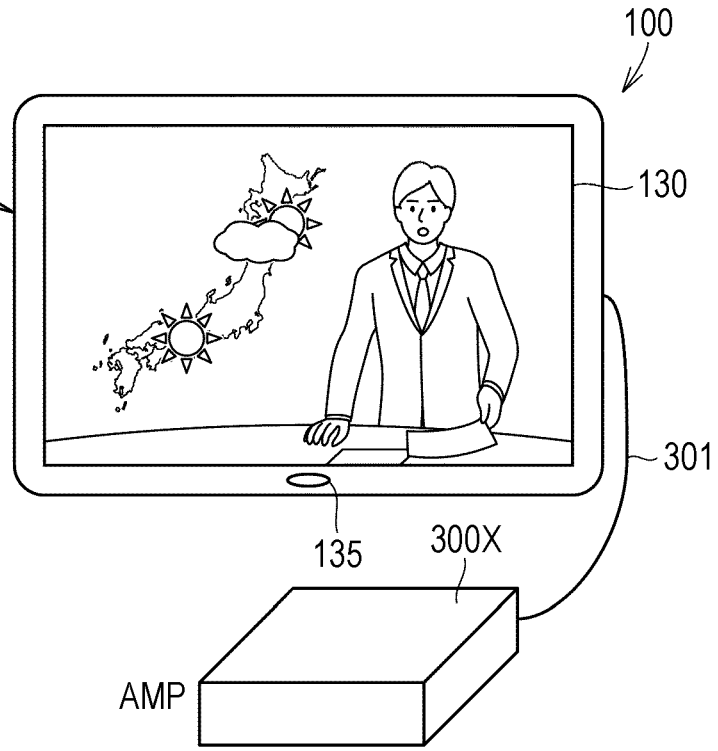
(B)
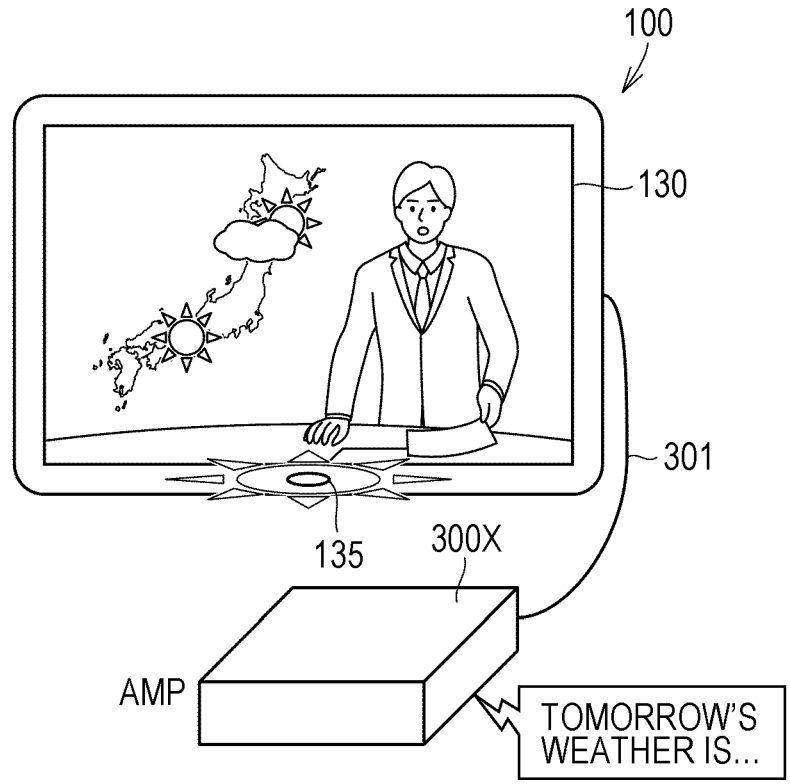

FIG. 40
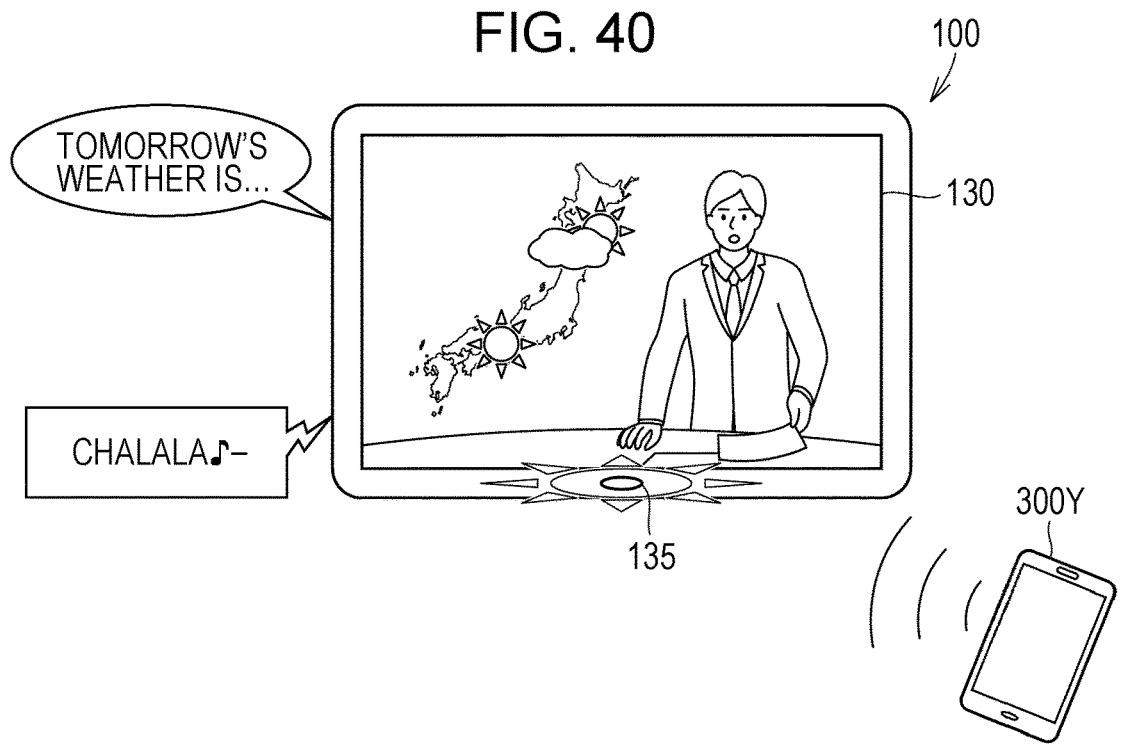
FIG. 41
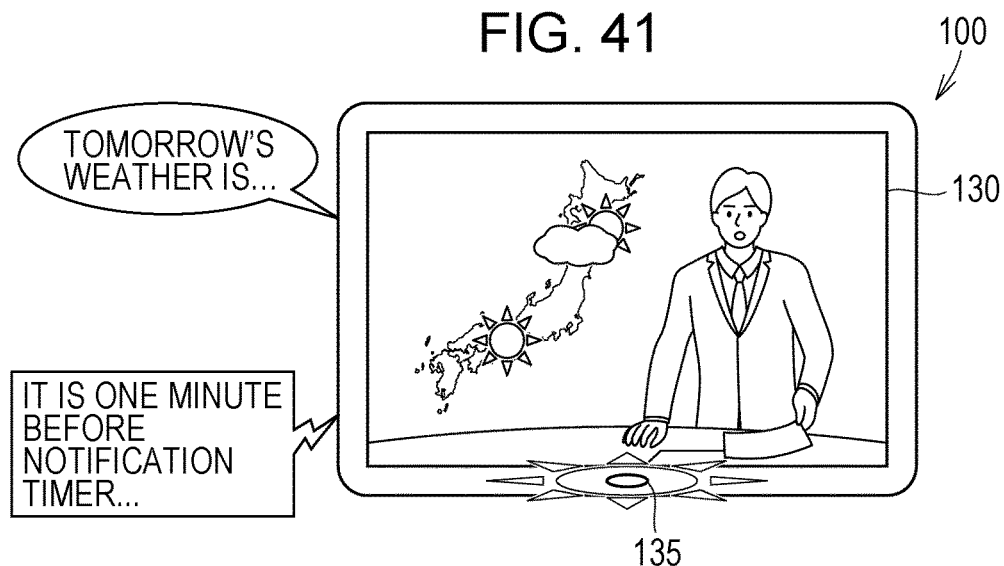
FIG. 42
| REMAINING TIME OF TIMER | COLOR OF LIGHT | BLINKING TEMPO | INTENSITY OF LIGHT |
|---|---|---|---|
| ⋮ | ⋮ | ⋮ | ⋮ |

FIG. 44
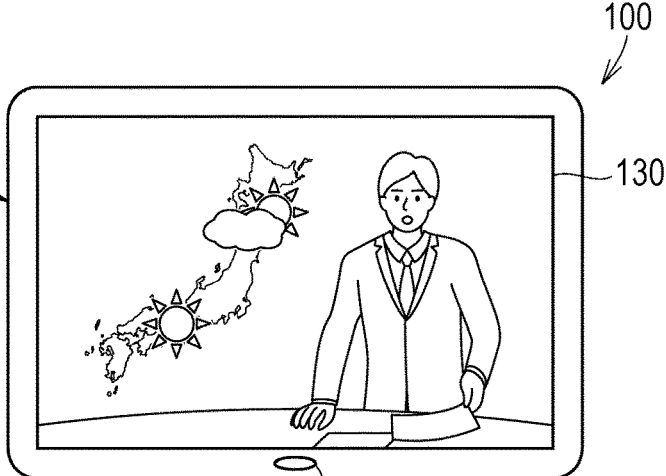
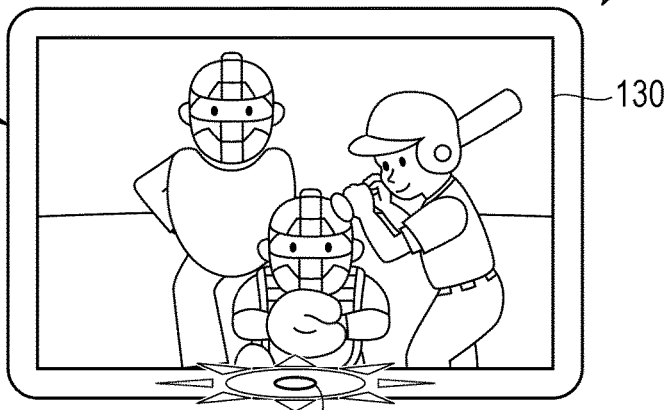

FIG. 45

| No. | OPERATION | ACTIVATION TRIGGER | SCREEN INTERLOCK | LED COLOR | OVERVIEW |
|---|---|---|---|---|---|
| ① | WAKE UP | WHEN TV IS ACTIVATED | O | CYAN | SMALL LIGHT SLOWLY APPEARS AND SCREEN IS STARTED FROM LIGHT |
| ② | SLEEP | WHEN TV IS OFF (WHEN "POWER" KEY IS PRESSED /WHEN KOKOROVISION IS AUTOMATICALLY OFF /WHEN TIMER SYSTEM IS OFF) | × | CYAN | SCREEN QUICKLY DISAPPEARS, LIGHT RAYS GRADUALLY FADE OUT (+ABOUT 1 SECOND) |
| ③ | REACT (SMALL) | WHEN KEY OTHER THAN UP, DOWN, LEFT, AND RIGHT KEYS IS PRESSED | × | CYAN | LIGHT GLOWS SHORTLY AND SUDDENLY IN SHORT TIME |
| ④ | REACT (INTERLOCK) | WHEN SOUND VOLUME KEY IS PRESSED | O | CYAN | GLOW ONCE WITH GUI APPEARANCE ANIMATION IT GLOWS IN MULTIPLICATION WITH REPEATED HITS AND LONG PRESS |
| ⑤ | LISTEN | WHEN CH KEY IS PRESSED | O | CYAN | AS REACTION TO KEY OPERATION, SHORT LIGHT + UI DISPLAY WHEN SELECTING CHANNEL |
| ⑥ | | DURING AUDIO RECOGNITION | × | CYAN | BLINK IN CONSTANT RHYTHM AS IF RESPONSE IS GIVEN |
| ⑦ | PROPOSE | WHEN KOKOROVISION IS ACTIVATED (SENSOR & BUTTON) | O | COLORFUL | ACTIVATION ~ CARD DISPLAY FIRST SWITCHING IS MADE SO AS TO MIX VARIOUS PALE COLORS TOGETHER, THEN LIGHT IS DARKENED ONCE, LIGHT OF STANDARD COLOR IS GRADUALLY INCREASED |
| ⑧ | SPEAK | DURING UTTERANCE OF KOKOROVISION | O | COLORFUL | AFTER CARD DISPLAY ~ UTTERANCE BLINK IN CONSTANT RHYTHM AS IF SPEAKING |
| ⑨ | ENCOUNTER | WHEN INITIAL SETTING IS COMPLETED | O | COLORFUL | EXPRESS AQUOS WORLD VIEW IN ABOUT 3 SECONDS (Movie) |
| ⑩ | NOTIFY | CAUTION · SPOT INFORMATION | O | CYAN | GIVE RECORDING START OR OFF-TIMER AWARENESS |
| ⑪ | THINKING | THING THAT TAKE TIME TO DISPLAY | O | COLORFUL? | FOR THING THAT TAKES TIME TO DISPLAY, REMOVE USER'S ANXIETY BY LETTING LIGHT TO GLOW SO THAT USER CAN SEE "TV IS THINKING" |

FIG. 54
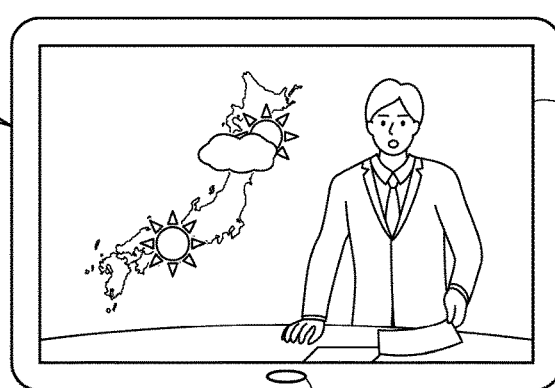
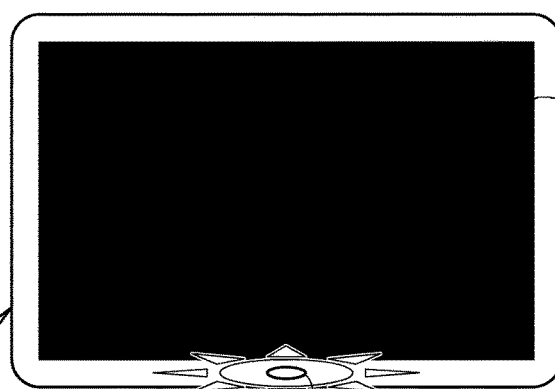

FIG. 55
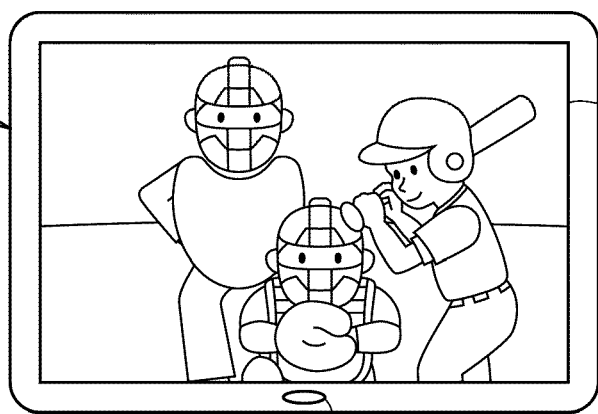
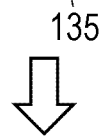
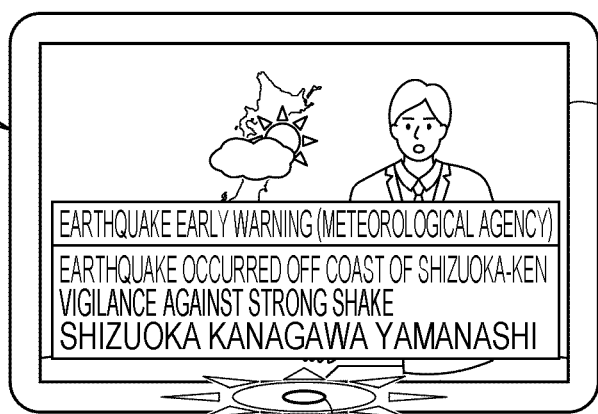

FIG. 56
(A) WHEN WATCHING IN REGION D: LIVE
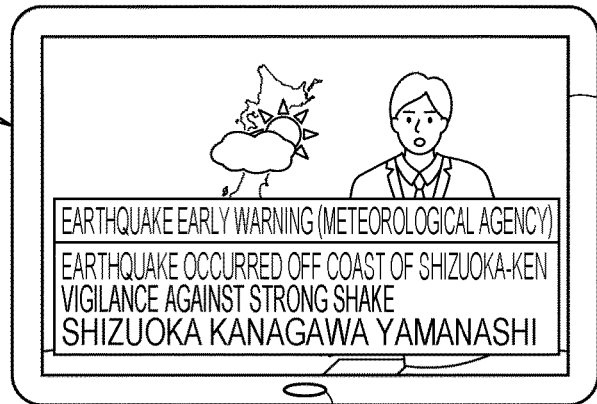
(B) WHEN RECORDED CONTENTS IS PLAYED: NON-LIVE
FIG. 57
| RECEPTION AMOUNT | PERSONALITY | COLOR OF LIGHT | TEMPO OF LIGHT | INTENSITY OF LIGHT |
|---|---|---|---|---|
| ⋮ | ⋮ | ⋮ | ⋮ | ⋮ |

| RADIO WAVE INTENSITY | PERSONALITY | COLOR OF LIGHT | TEMPO OF LIGHT | INTENSITY OF LIGHT |
|---|---|---|---|---|
| ⋮ | ⋮ | ⋮ | ⋮ | ⋮ |

1203

FIG. 60
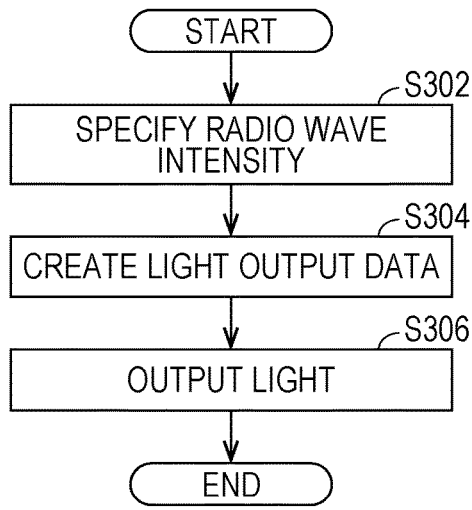
FIG. 61
| ERROR | PERSONALITY | COLOR OF LIGHT | TEMPO OF LIGHT | INTENSITY OF LIGHT |
|---|---|---|---|---|
| REMOTE CONTROL NUMBER | ... | ... | ... | ... |
| CHILD LOCK | ... | ... | ... | ... |
| REGION APPLICABLE | ... | ... | ... | ... |
| ⋮ | ⋮ | ⋮ | ⋮ | ⋮ |
1204
FIG. 62
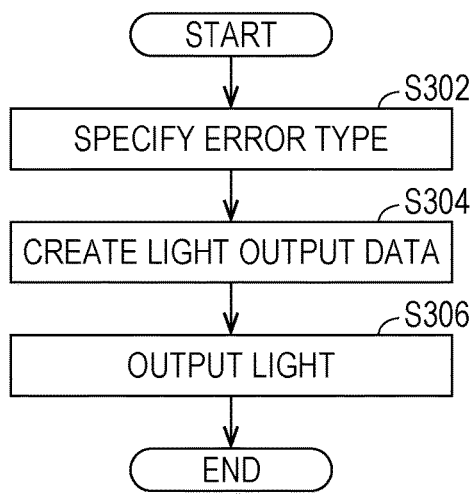

| ABNORMALITY LEVEL | PERSONALITY | COLOR OF LIGHT | TEMPO OF LIGHT | INTENSITY OF LIGHT |
|---|---|---|---|---|
| LOW | ... | ... | ... | ... |
| MEDIUM | ... | ... | ... | ... |
| HIGH | ... | ... | ... | ... |

1205

| SOUND VOLUME LEVEL | PERSONALITY | COLOR OF LIGHT | TEMPO OF LIGHT | INTENSITY OF LIGHT |
|---|---|---|---|---|
| LOW | ... | ... | ... | ... |
| MEDIUM | ... | ... | ... | ... |
| HIGH | ... | ... | ... | ... |

1206

FIG. 66
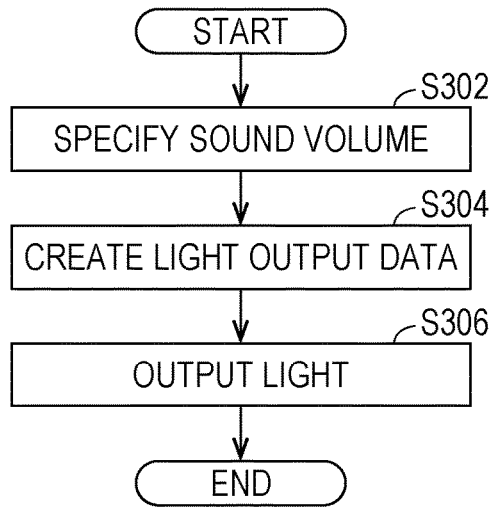
FIG. 67
| BRIGHTNESS LEVEL | PERSONALITY | COLOR OF LIGHT | TEMPO OF LIGHT | INTENSITY OF LIGHT |
|---|---|---|---|---|
| LOW | ... | ... | ... | ... |
| MEDIUM | ... | ... | ... | ... |
| HIGH | ... | ... | ... | ... |
1207
FIG. 68
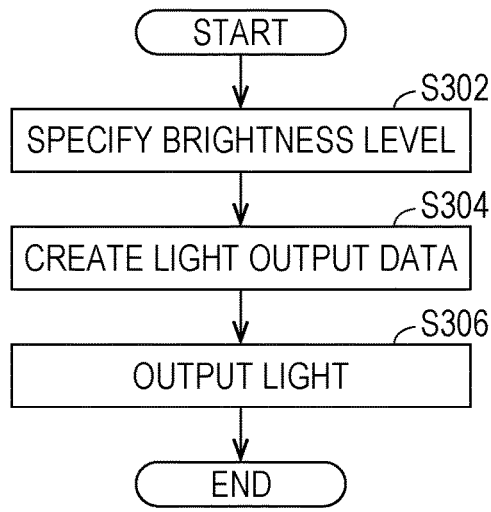

LIGHT OUTPUT SYSTEM

TECHNICAL FIELD

One aspect of the present invention relates to an output method of light from a device, and in particular to a technique for outputting light according to audio output from the device, a state of the device, or the like.

BACKGROUND ART

Conventionally, a device in which a light is lit according to a predetermined condition is known. For example, a display device is disclosed in International Publication No. 13/099630 (PTL 1). According to PTL 1, a television receiver includes an indicator unit that is disposed at least in a part of a periphery of a display unit for displaying a predetermined image and that includes an indicator that lights up with predetermined luminance and a display control unit that controls the image to be displayed on the display unit so that the image is coordinated with lighting of the indicator.

CITATION LIST

Patent Literature

PTL 1: International Publication No. 13/099630

SUMMARY OF INVENTION

Technical Problem

An object according to one aspect of the present invention is to provide a light output system which can output light suitable for audio output from a device or a state of the device, or the like.

Solution to Problem

According to an aspect of the invention, there is provided a light output system including a speaker, a light output unit, and a processor to cause first audio and second audio to be output from the speaker and cause the light output unit to output light corresponding to the output of the second audio. Two types of audio may be different from each other in acquisition source and obtaining source and the two types of audio may be ones that are the same in acquisition source or obtaining source and different from each other in types of audio and types of information. Light corresponding to the second audio may blink at the same tempo as the audio, or luminance or intensity thereof may be changed in accordance with a pitch.

Preferably, the light output system further includes a display. The processor causes video corresponding to at least one of the first audio and the second audio to be displayed on the display.

Preferably, the processor causes light to be output in the vicinity of the light output unit of the display in accordance with light to be output from the light output unit.

Preferably, the processor causes video corresponding to the first audio and video corresponding to the second audio to be displayed on the display side by side.

Preferably, the light output unit is a part or the whole of a display.

Preferably, the second audio is sub-audio.

Preferably, the second audio includes information about a next program.

Preferably, the light output system further includes a communication interface to communicate with another electric device or a server. The second audio includes information from the other electric device or the server.

Preferably, the light output system further includes a communication interface to communicate with another electric device or a server. The processor sets a color of light to be output from the light output unit based on information from the other electric device or the server.

Preferably, the light output system further includes a microphone. The processor causes the speaker to output the second audio based on audio input from the microphone.

Preferably, the processor causes the speaker to output the second audio based on acquired text.

According to another aspect of the present invention, there is provided a television including a speaker, a light output unit, and a processor to cause first audio and second audio to be output from the speaker and cause the light output unit to output light corresponding to the output of the second audio.

According to still another aspect of the present invention, there is provided a method of controlling a light output system including a speaker and a light output unit. The method includes a step of causing the speaker to output first audio and second audio and a step of causing the light output unit to output light corresponding to the output of the second audio.

According to still another aspect of the present invention, there is provided a program for a light output system including a speaker, a light output unit, and a processor. The program causes the processor to execute a step of causing the speaker to output first audio and second audio and a step of causing the light output unit to output light corresponding to the output of the second audio.

According to still another aspect of the present invention, there is provided a computer readable recording medium storing a program for a light output system including a speaker, a light output unit, and a processor. The program causes the processor to execute a step of causing the speaker to output first audio and second audio and a step of causing the light output unit to output light corresponding to the output of the second audio.

Advantageous Effects of Invention

As described above, according to one aspect of the present invention, there is provided a light output system capable of outputting light suitable for audio output from a device, a state of the device, or the like.

BRIEF DESCRIPTION OF DRAWINGS

FIG. 11 is an image diagram illustrating a repetition database 121 according to the fifth embodiment.

FIG. 12 is an image diagram illustrating a notification database 122 according to the fifth embodiment.

FIG. 13 is a flowchart illustrating information processing in the light output system 100 according to the fifth embodiment.

FIG. 14 is an image diagram illustrating an emotion database 123 according to a sixth embodiment.

FIG. 15 is a flowchart illustrating information processing in the light output system 100 according to the sixth embodiment.

FIG. 16 is an image diagram illustrating a time zone database 124 according to a seventh embodiment.

FIG. 18 is an image diagram illustrating an operation overview of the light output system 100 according to an eighth embodiment.

FIG. 19 is an image diagram illustrating a degree-of-urgency database 125 according to the eighth embodiment.

FIG. 21 is an image diagram illustrating an operation overview of the light output system 100 according to a ninth embodiment.

FIG. 22 is an image diagram illustrating a user database 126 according to the ninth embodiment.

FIG. 23 is a flowchart illustrating information processing in the light output system 100 according to the ninth embodiment.

FIG. 24 is an image diagram illustrating an operation overview of the light output system 100 according to a tenth embodiment.

FIG. 32 is an image diagram illustrating an operation overview of the light output system 100 according to a thirteenth embodiment.

FIG. 39 is an image diagram illustrating an operation overview of the light output system 100 according to a seventeenth embodiment.

FIG. 40 is an image diagram illustrating an operation overview of the light output system 100 according to an eighteenth embodiment.

FIG. 41 is an image diagram illustrating an operation overview of the light output system 100 according to a nineteenth embodiment.

FIG. 42 is an image diagram illustrating a timer database 128 according to the nineteenth embodiment.

FIG. 44 is an image diagram illustrating an operation overview of the light output system 100 according to a twentieth embodiment.

FIG. 45 is an image diagram illustrating an operation pattern of the light output system 100 according to a twenty-second embodiment.

FIG. 54 is an image diagram illustrating an operation overview of the light output system 100 according to a twenty-fourth embodiment.

FIG. 55 is an image diagram illustrating an operation overview of the light output system 100 according to a twenty-fifth embodiment.

FIG. 56 is an image diagram illustrating an operation overview of the light output system 100 according to a twenty-sixth embodiment.

FIG. 57 is an image diagram illustrating a transmission and reception amount database 1202 according to a twenty-seventh embodiment.

FIG. 60 is a flowchart illustrating information processing in the light output system 100 according to the twenty-eighth embodiment.

FIG. 61 is an image diagram illustrating an error database 1204 according to a twenty-ninth embodiment.

FIG. 62 is a flowchart illustrating information processing in the light output system 100 according to the twenty-ninth embodiment.

FIG. 66 is a flowchart illustrating information processing in the light output system 100 according to the thirty-first embodiment.

FIG. 67 is an image diagram illustrating a brightness database 1207 according to a thirty-second embodiment.

FIG. 68 is a flowchart illustrating information processing in the light output system 100 according to the thirty-second embodiment.

DESCRIPTION OF EMBODIMENTS

Figure 1:
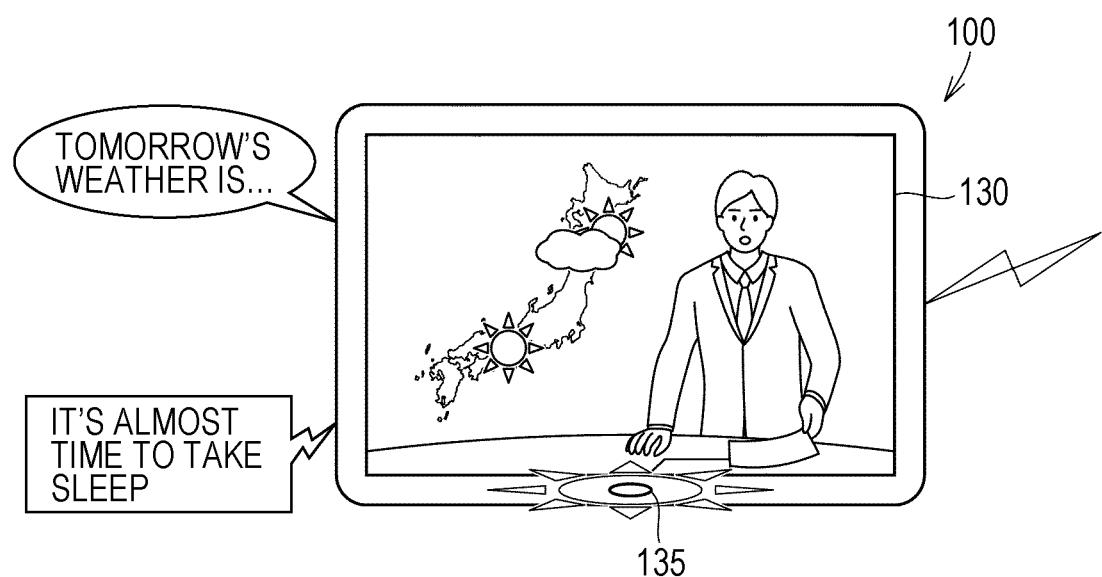
FIG. 1 is a front view illustrating a light output system 100 according to a first embodiment.

Hereinafter, with reference to the drawings, embodiments of the present invention will be described. In the following description, the same parts are denoted by the same reference numerals. Names and functions thereof are also the same. Accordingly, detailed description thereof will not be repeated.

First Embodiment

<Overview of Operation of Light Output System>

With reference to FIG. 1, in this embodiment, light output system 100 is a television. The light output system 100 outputs first audio corresponding to a television broadcast from a speaker while outputting an image from a display by receiving the television broadcast. However, the light output system 100 may acquire various types of information from a server via the Internet or the like.

In this embodiment, the light output system 100 outputs second audio different from the television broadcast. In this embodiment, the second audio is a schedule of a user, a weather forecast, or the like downloaded via the Internet or the like.

In this embodiment, the light output system 100 is equipped with an LED light 135. Then, in the light output system 100, the LED light 135 emits light so as to correspond to the second audio.

Thus, in the light output system 100 according to this embodiment, since the LED light 135 emits light corresponding to the second audio, the user is likely to observe that the second audio is being output each time.

Hereinafter, a specific configuration of the light output system 100 for realizing such a function will be described in detail.

<Configuration of Light Output System 100>

Figure 2:
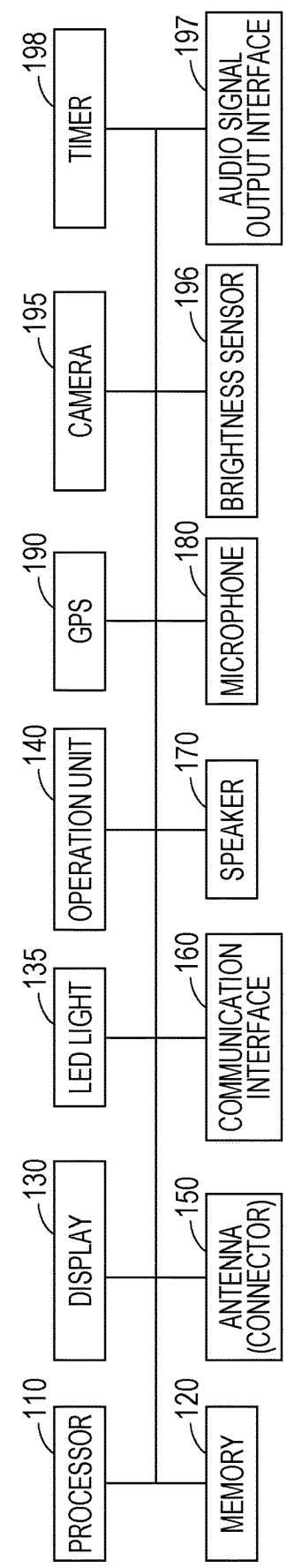
FIG. 2 is a block diagram representing a configuration of the light output system 100 according to the first embodiment.

First, a description will be made on an aspect of a configuration of the light output system 100 according to this embodiment. FIG. 2 is a block diagram illustrating the configuration of the light output system 100 according to this embodiment.

Referring to FIG. 2, the light output system 100, as main components, a central processing unit (CPU) 110, a memory 120, a display 130, an LED light 135, an operation unit 140, an antenna 150, a communication interface 160, a speaker 170, a microphone 180, a global positioning system (GPS) 190, a camera 195, a brightness sensor 196, an audio signal output interface 197, and a timer 198.

The CPU 110 executes a program stored in the memory 120 to control each unit of the light output system 100. For example, the CPU 110 executes the program stored in the memory 120 and refers to various data, thereby executing various processing to be described later.

The memory 120 is realized by various random access memories (RAMs), various read-only memories (ROMs), and the like. The memory 120 stores programs executed by the CPU 110, data generated by the execution of the program by the CPU 110, correspondence relationships between the second audio, luminance and intensity of light, and shops.

The display 130 displays text and images based on a signal from the CPU 110. The LED light 135 emits light in response to the second audio based on a signal from the CPU 110.

The operation unit 140 receives an instruction of a service administrator or the like and inputs the instruction to the CPU 110.

The antenna 150 receives a television broadcast or the like. More specifically, the light output system 100 may include a connector for receiving a television broadcast signal from an outdoor antenna instead of the antenna 150.

The communication interface 160 transmits data from the CPU 110 to another apparatus such as a server via the Internet, a carrier network, a router, or the like. In contrast, the communication interface 160 receives data from another apparatus such as a server via the Internet, a carrier network, a router, or the like and transfers the data to the CPU 110.

The speaker 170 outputs audio based on a signal from the CPU 110. The microphone 180 generates an audio signal based on audio from the outside and inputs the audio signal to the CPU 110.

The GPS 190 acquires a current position of the light output system 100 and delivers the current position to the CPU 110.

The camera 195 images the outside of the light output system 100 based on the signal from the CPU 110. The captured image data is stored in the memory 120.

The brightness sensor 196 detects brightness around the light output system 100 based on the signal from the CPU 110. The detection result is stored in the memory 120.

The audio signal output interface 197 outputs an audio signal to an external speaker, amplifier, headphone, earphone, and the like.

The timer 198 measures the elapsed time from a predetermined time, measures the remaining time until a predetermined time, and transfers the time to the CPU 110.

<Information Processing in Light Output System 100>

Figure 3:
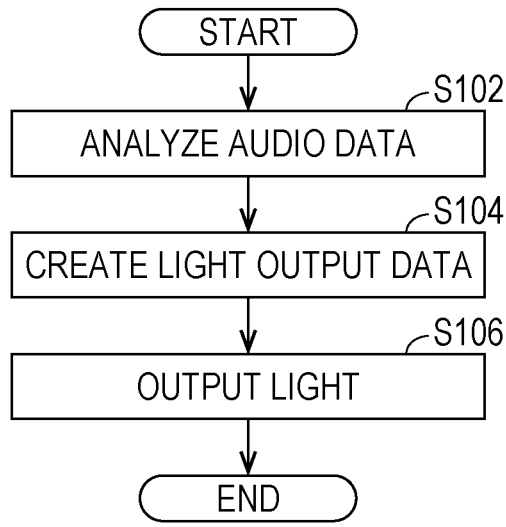
FIG. 3 is a flowchart illustrating information processing in the light output system 100 according to the first embodiment.

Next, with reference to FIG. 3, information processing in Light output system 100 according to this embodiment will be described. The CPU 110 of the light output system 100 executes following processing when outputting the second audio.

First, the CPU 110, as illustrated in FIG. 4(A), analyzes the second audio (step S102).

The CPU 110 specifies an output method of light corresponding to the analyzed audio (step S104). For example, the CPU 110 increases the intensity of light corresponding to large audio, weaken the intensity of light corresponding to small audio, sets luminance to make it close to red color corresponding to high audio, sets luminance to make it close to blue color corresponding to low audio, advances the blinking tempo corresponding to audio with large fluctuation, or delays the blinking tempo corresponding to audio with small fluctuation.

The CPU 110 causes the speaker 170 to output audio and causes the LED light 135 to emit light (step S106) based on the determined output method as illustrated in FIG. 4(B).

Regarding the light output system 100 according to this embodiment, the output of the second audio is visually more emphasized. Then, when the LED light 135 is lit, it is possible for the user to visually recognize that information other than program information is being output. Also, for example, the CPU 110 may receive data including information indicating importance, and display important information on the display 130 as much as possible or strongly light the LED light 135.

Second Embodiment

Figure 4:
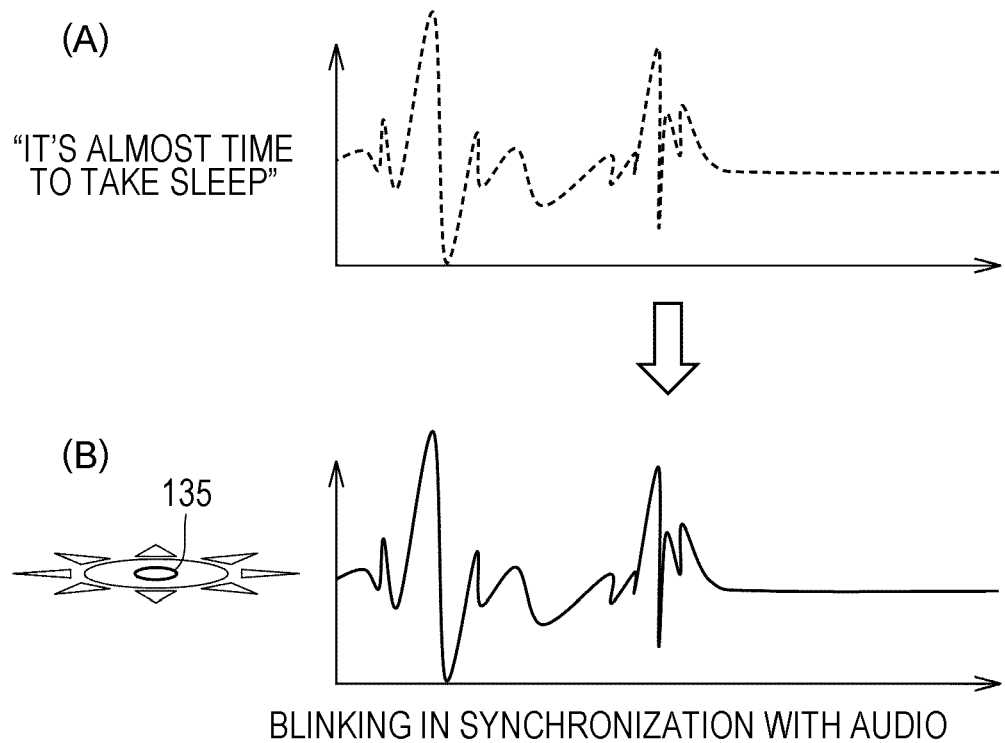
FIG. 4 is an image diagram illustrating an audio analysis and light output according to the first embodiment.

In the first embodiment, as illustrated in FIG. 4, the output method of light corresponding to the analyzed second audio was also specified. In this embodiment, while the second audio is being output, the LED light 135 lights up or blinks with constant intensity or luminance.

Figure 5:
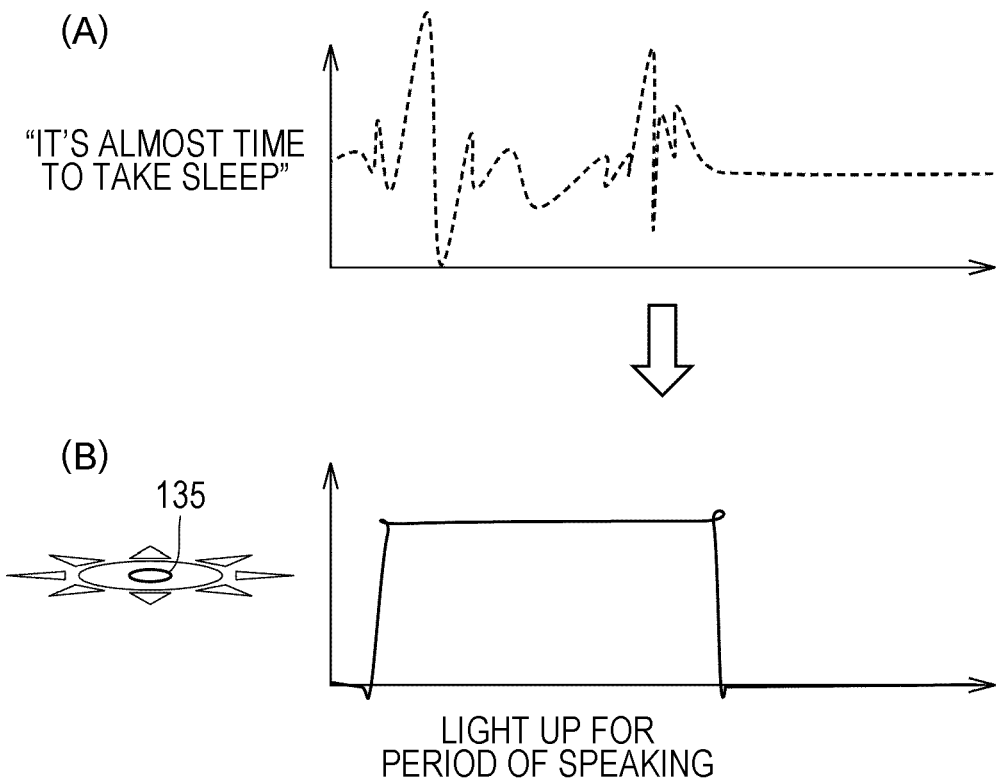
FIG. 5 is an image diagram illustrating an audio analysis and light output according to a second embodiment.

For example, the CPU 110 of the light output system 100, as illustrated in FIG. 5(A), analyzes the second audio (step S102). The CPU 110 specifies the period during which the second audio is output, thereby specifying the light output method (step S104). As illustrated in FIG. 5(B), the CPU 110 causes the LED light 135 to emit light based on the determined output method (step S106).

Third Embodiment

In the first embodiment, the light output system 100 was a television. However, the light output system 100 is not limited to the television.

Figure 6:
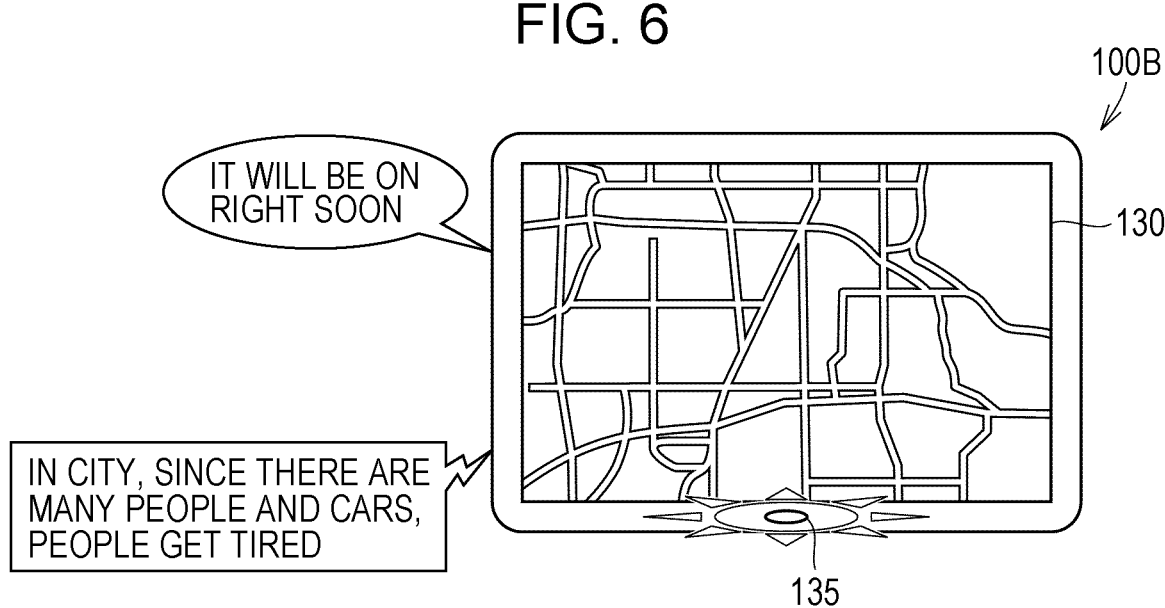
FIG. 6 is a front view illustrating a car navigation system as the light output system 100 according to a third embodiment.

For example, the light output system 100, as illustrated in FIG. 6, may be a car navigation system 100B. More specifically, the light output system 100 outputs car navigation information as the first audio while displaying road guide information. Then, the light output system 100 outputs other notifications and spoken words as the second audio. Also, in this embodiment, in the light output system 100, the LED light 135 lights up or blinks corresponding to the second audio. Thus, the user can recognize that the second audio is being output.

Figure 7:
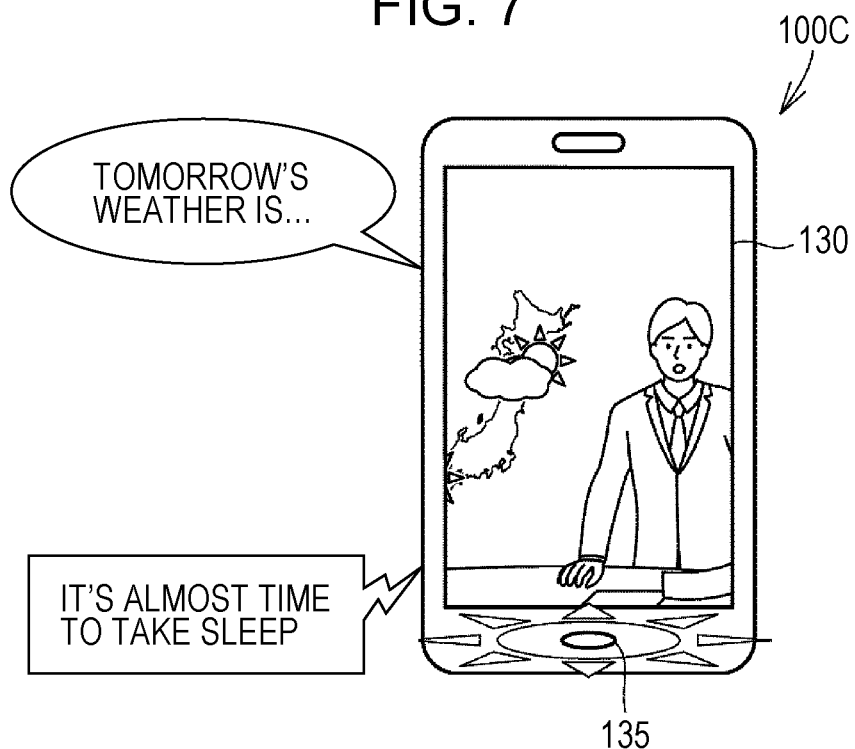
FIG. 7 is a front view illustrating a smartphone as the light output system 100 according to the third embodiment.

Alternatively, the light output system 100, as illustrated in FIG. 7, may be a smart phone 100C (or smart television) or the like. More specifically, the light output system 100 outputs audio of the content as the first audio while displaying the image of the content acquired from a moving image browsing site, the television, or the like. Then, the light output system 100 outputs other notifications and spoken words as the second audio. Also, in this embodiment, in the light output system 100, the LED light 135 lights up or blinks corresponding to the second audio.

Figure 8:
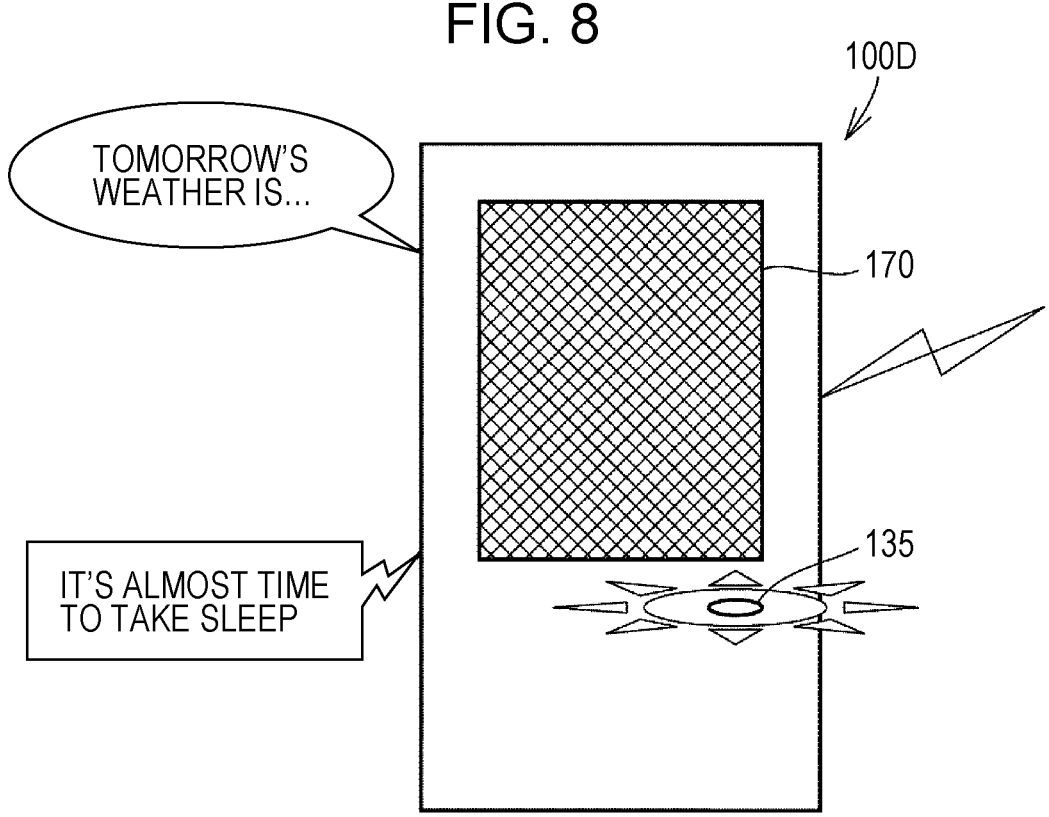
FIG. 8 is a front view illustrating a speaker as the light output system 100 according to the third embodiment.

Alternatively, the light output system 100, as illustrated in FIG. 8, may be an apparatus not equipped with a display. For example, the light output system 100 may be a speaker 100D. More specifically, the light output system 100 outputs audio of the content acquired from a CD or an antenna as the first audio. Then, the light output system 100 outputs other notifications and spoken words as the second audio. Also, in this embodiment, in the light output system 100, the LED light 135 lights up or blinks corresponding to the second audio.

As a result, it is understood that audio of service or application different from the audio of the car navigation system 100B is being output.

Fourth Embodiment

In the first to third embodiments, the light output system 100 causes the LED light 135 to emit light in accordance with the second audio. However, it is not limited to such a form. The light output system 100 may emit part or all of the display 130 instead of the LED light 135, in accordance with the second audio.

Figure 9:
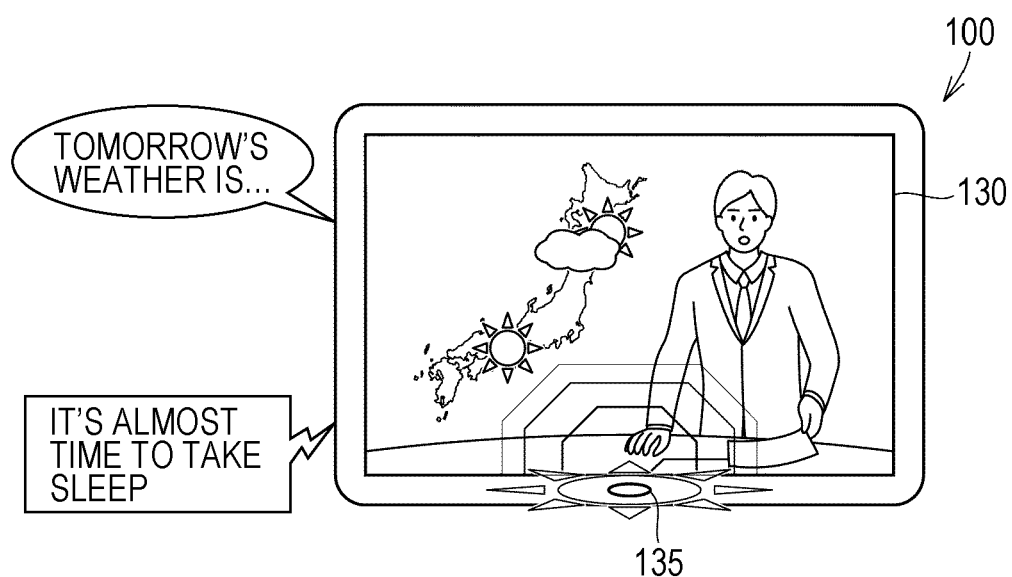
FIG. 9 is a front view illustrating the light output system 100 according to a fourth embodiment.

Alternatively, as illustrated in FIG. 9, the CPU 110 of the light output system 100 may blink or light a part of the display 130 while blinking or lighting the LED light 135, in accordance with the second audio output from the speaker 170. For example, the CPU 110 may cause the display 130 to output light in a wave shape from the vicinity of the LED light 135 when the LED light 135 blinks or lights up.

Fifth Embodiment

In the first to fourth embodiments, the light output system 100 causes the LED light 135 to emit light in accordance with the second audio. The light output system 100 may repeatedly output the second audio a plurality of times.

Figure 10:
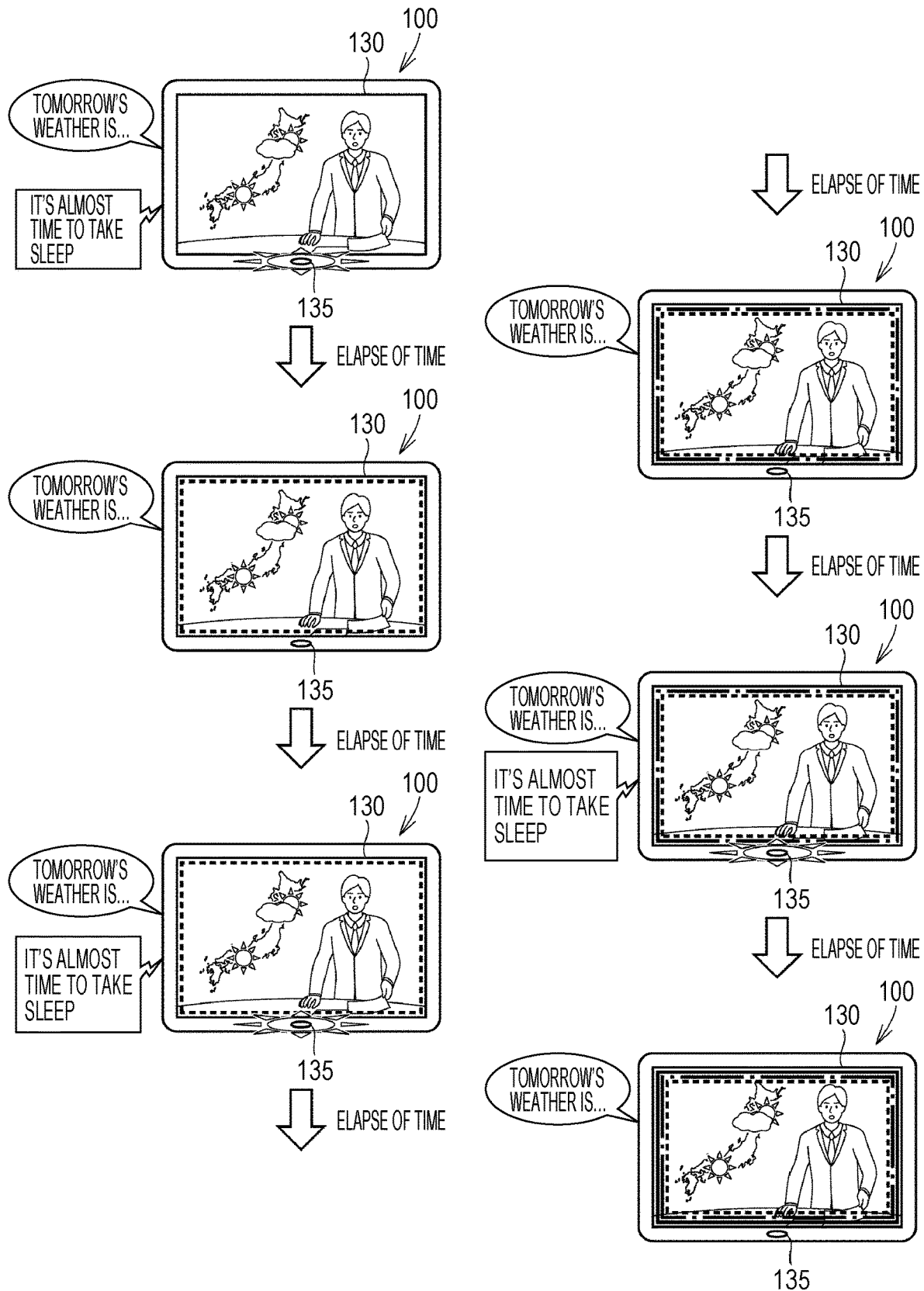
FIG. 10 is an image diagram illustrating an operation overview of the light output system 100 according to a fifth embodiment.

For example, as illustrated in FIG. 10, the light output system 100 outputs a notification message to the user as the second audio a plurality of times at predetermined time intervals. As the number of times increases, the light output system 100 may increase the second audio, change neglectful tone, change intensity, luminance, and tempo of the LED light 135.

More specifically, the memory 120 of the light output system 100 stores a repetition database 121. As illustrated in FIG. 11, the repetition database 121 stores a relationship between the number of times of output, sound volume, intensity of light, color (luminance) of light, and the blinking tempo of light. Then, the memory 120 further stores a notification database 122, as illustrated in FIG. 12. The notification database 122 includes, for each notification message, a correspondence relationship between a notification ID, audio data or its address, and a flag for each of the number of times of output.

In the following, with reference to FIG. 13, information processing of the light output system 100 according to this embodiment will be described. The CPU 110 of the light output system 100 executes following processing when outputting the second audio.

First, the CPU 110, as illustrated in FIG. 4(A), analyzes the second audio (step S102). Then, with reference to the notification database 122, the CPU 110 specifies how many times the next output of audio to be output is (step S103).

The CPU 110 specifies an output method of light corresponding to the analyzed audio (step S104). In this embodiment, the CPU 110 refers to the repetition database 121 and specifies an output method of audio and an output method of light based on the number of times of output of audio.

The CPU 110 causes the speaker 170 to output audio based on the determined output method of audio and causes the LED light 135 to emit light based on the determined t output method of light as illustrated in FIG. 4(B) (step S106). For example, any display may be performed near the outer periphery of the display so that the number of times of output can be known.

As a result, even if the user misses certain message audios, the user knows from behind that the user has been notified many times. In addition, the user feels as if the light output system 100 has emotions like a human being.

Sixth Embodiment

In the fifth embodiment, the output method of light was different based on the number of times of output. However, it is not limited to such a form. For example, instead of or in addition to the repetition database 121, the memory 120 of the light output system 100 may store an emotion database 123.

More specifically, with reference to FIG. 14, the emotion database 123 stores a relationship between emotion, intensity of light, color (luminance) of light, blinking tempo of light, and the like corresponding to an operation of the device and a surrounding state of the device. Emotion is an emotion of the light output system 100 when it is assumed that the light output system 100 has a feeling similar to a human being. For example, it is preferable to output blue light when sad emotion is set in the light output system 100 and red light when emotion of anger is set. Thus, the user can feel just like that the light output system 100 has emotion. The emotion database 123 may store sound volume for each emotion.

Hereinafter, with reference to FIG. 15, information processing of the light output system 100 according to this embodiment will be described. The CPU 110 of the light output system 100 executes the following processing when outputting the second audio.

First, the CPU 110, as illustrated in FIG. 4(A), analyzes the second audio (step S102). Then, the CPU 110 specifies emotion according to the current operation state of the light output system 100 or acquires emotion of the light output system 100 from a server via the communication interface 160 (step S103B).

The CPU 110 specifies an output method of light corresponding to the analyzed audio (step S104). In this embodiment, the CPU 110 refers to the emotion database 123 and specifies the output method of audio and the output method of light based on the emotion of the light output system 100.

The CPU 110 causes the speaker 170 to output audio based on the determined output method of audio and causes the LED light 135 to emit light based on the determined output method of light as illustrated in FIG. 4(B) (step S106).

Thus, the user feels as if the light output system 100 has emotion like a human being.

Seventh Embodiment

Alternatively, instead of the repetition database 121, or in addition to the repeating database 121, the memory 120 of the light output system 100 may store the time zone database 124. More specifically, with reference to FIG. 16, the time zone database 124 stores a relationship between the time zone, the intensity of light, the color (luminance) of light, and the blinking tempo of light. The time zone database 124 may store the sound volume for each time zone.

Figure 17:
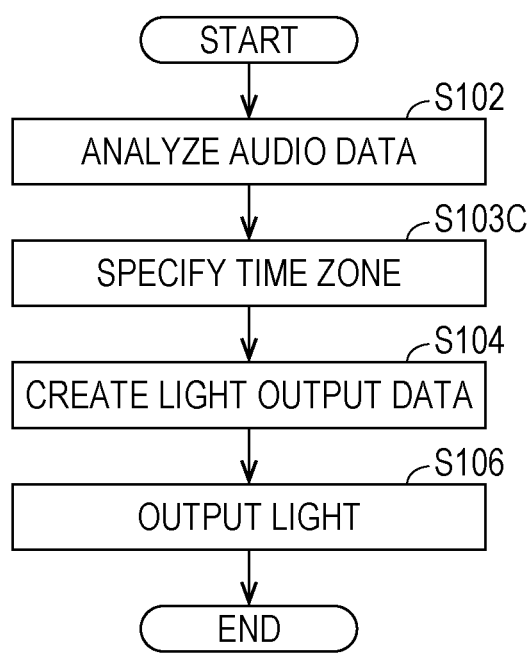
FIG. 17 is a flowchart illustrating information processing in the light output system 100 according to the seventh embodiment.

In the following, with reference to FIG. 17, information processing of the light output system 100 according to this embodiment will be described. The CPU 110 of the light output system 100 executes the following processing when outputting the second audio.

First, the CPU 110, as illustrated in FIG. 4(A), analyzes the second audio (step S102). Then, the CPU 110 acquires the current time zone (step S103C)

The CPU 110 specifies an output method of light corresponding to the analyzed audio (step S104). In this embodiment, the CPU 110 refers to the time zone database 124 and specifies an output method of audio and an output method of light according to the current time zone.

The CPU 110 causes the speaker 170 to output audio based on the determined output method of audio and causes the LED light 135 to emit light based on the determined output method of light illustrated in FIG. 4(B) (step S106).

Thus, the user can feel pleasantness according to the time zone.

Eighth Embodiment

Alternatively, as illustrated in FIG. 18, output methods of audio and light may be different between a normal notification message and a notification message with a high warning level. That is, instead of the repetition database 121 or in addition to the repetition database 121, the memory 120 of the light output system 100 may store the degree-of-urgency database 125. More specifically, with reference to FIG. 19, the degree-of-urgency database 125 stores a relationship between the degree of urgency, the intensity of light, the color (luminance) of light, and the blinking tempo of light. The degree-of-urgency database 125 may store the volume for each degree of urgency.

Figure 20:
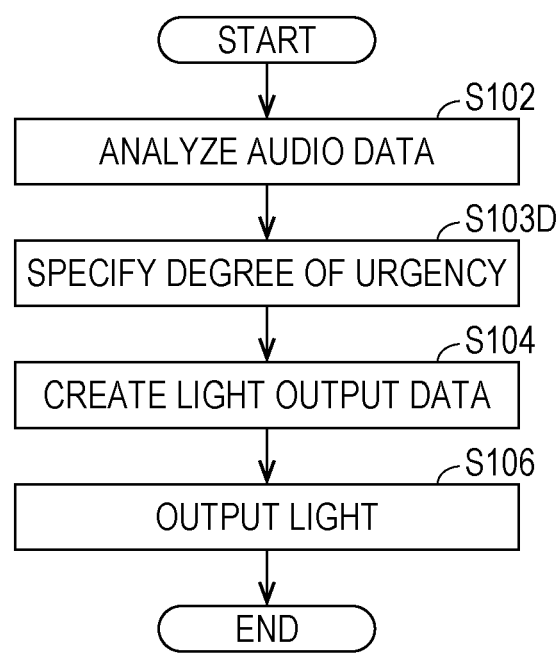
FIG. 20 is a flowchart illustrating information processing in the light output system 100 according to the eighth embodiment.

In the following, with reference to FIG. 20, information processing of the light output system 100 according to this embodiment will be described. The CPU 110 of the light output system 100 executes the following processing when outputting the second audio.

First, the CPU 110, as illustrated in FIG. 4(A), acquires second audio from data acquired from the outside. The CPU 110 analyzes the second audio (step S102). In particular, the CPU 110 acquires a degree of urgency of notification information from the data (step S103D). The degree of urgency may be included in the data from the server, or the CPU 110 may determine the degree of urgency from the data from the server.

The CPU 110 specifies an output method of light corresponding to the analyzed audio (step S104). In this embodiment, the CPU 110 refers to the degree-of-urgency database 125 and specifies an output method of audio and an output method of light according to the degree of urgency.

The CPU 110 causes the speaker 170 to output audio based on the determined output method of audio and causes the LED light 135 to emit light based on the determined output method of light as illustrated in FIG. 4(B) (step S106).

Thus, the user can visually ascertain the degree of urgency, importance, and the like.

Ninth Embodiment

Alternatively, as illustrated in FIG. 21, output methods of audio and light may be different depending on the user around the light output system 100. That is, instead of the repetition database 121 or in addition to the repetition database 121, the memory 120 of the light output system 100 may store the user database 126. More specifically, with reference to FIG. 22, the user database 126 stores a relationship between a user ID, the intensity of light, the color (luminance) of light, and the blinking tempo of light for each user. The user database 126 may also store the sound volume for each user.

Thus, it becomes possible to output appropriate light to a color-vision impaired person. Alternatively, the presence or absence of subtitles may be notified to the hearing impaired person by light. Alternatively, it is possible to weaken light for elderly users and reduce fatigue of the user's eyes. Alternatively, the presence or absence of subtitles may be notified to a hearing impaired person by light.

In the following, with reference to FIG. 23, information processing of the light output system 100 according to this embodiment will be described. The CPU 110 of the light output system 100 executes the following processing when outputting the second audio.

First, the CPU 110, as illustrated in FIG. 4(A), analyzes the second audio (step S102). Then, based on an image from the camera 195, the CPU 110 specifies the user around the light output system 100 (step S103E). The CPU 110 may specify surrounding users based on audio from the microphone 180 or specify the surrounding users by detecting the user's smartphone via WiFi or bluetooth via the communication interface 160.

The CPU 110 specifies an output method of light corresponding to the analyzed audio (step S104). In this embodiment, the CPU 110 refers to the user database 126 and specifies the output method of audio and the output method of light according to the user.

The CPU 110 causes the speaker 170 to output audio based on the determined output method of audio and causes the LED light 135 to emit light based on the determined output method of light as illustrated in FIG. 4(B) (step S106).

Thus, it is possible to customize preference of each user, and it is possible to effectively communicate information to people with disabilities. In addition, since the manner of contacting him and/or her is different from other users, it becomes easy for each user to attach attachment to the light output system 100.

Tenth Embodiment

Alternatively, as illustrated in FIG. 24, upon receiving information on emergency bulletin such as text, the CPU 110 of the light output system 100 may convert the text into audio and handle the audio as second sound.

Figure 25:
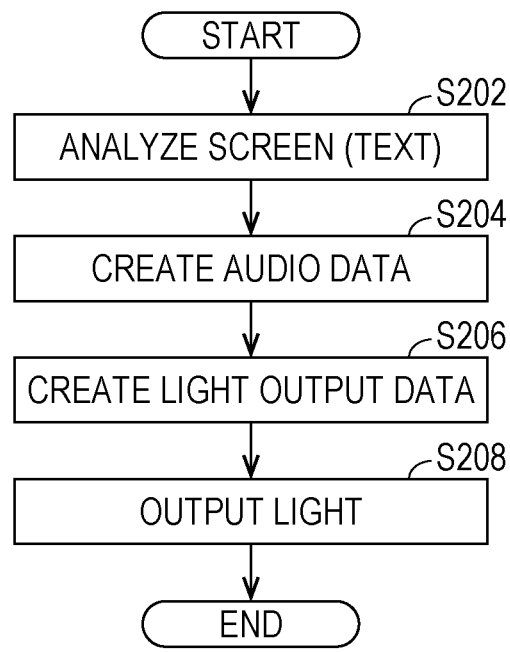
FIG. 25 is a flowchart illustrating information processing in the light output system 100 according to the tenth embodiment.

In the following, with reference to FIG. 25, information processing of the light output system 100 according to this embodiment will be described. Upon receiving the emergency bulletin information, the CPU 110 of the light output system 100 executes the following processing.

First, the CPU 110 acquires the emergency bulletin information of text from the received data (step S202). The CPU 110 converts the text into audio (step S204). The CPU 110 specifies an output method of light corresponding to the converted audio (step S206).

The CPU 110 causes the speaker 170 to output audio based on the determined output method of audio and causes the LED light 135 to emit light based on the determined output method of audio as illustrated in FIG. 4(B) (step S106).

People with poor eyesight and those with blind spots are easy to grasp emergency information. Further, since the emergency information is displayed synchronously with the LED light 135, it is easy to grasp that there is emergency information different from information of the program being broadcasted.

Eleventh Embodiment

Figure 26:
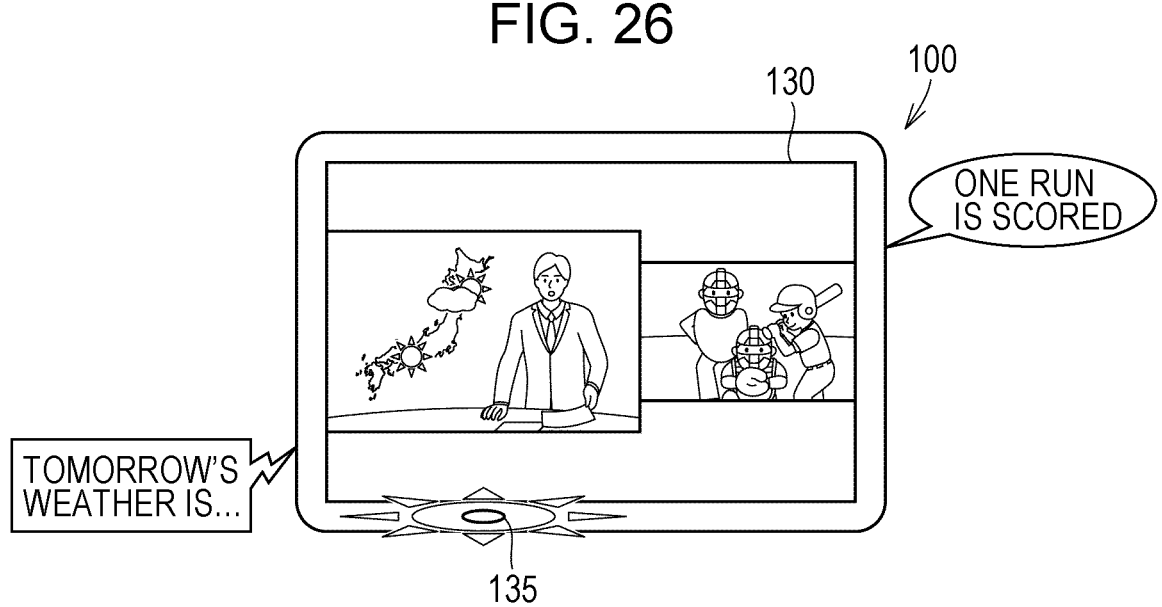
FIG. 26 is an image diagram illustrating a first operation overview of the light output system 100 according to an eleventh embodiment.
Figure 27:
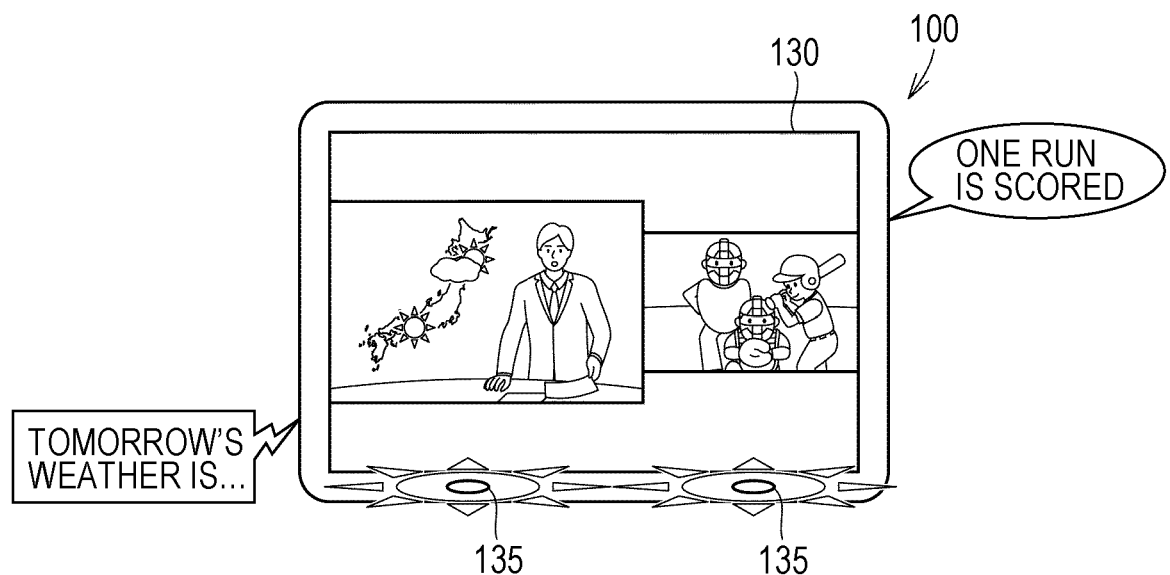
FIG. 27 is an image diagram illustrating a second operation overview of a light output system 100 according to the eleventh embodiment.
Figure 28:
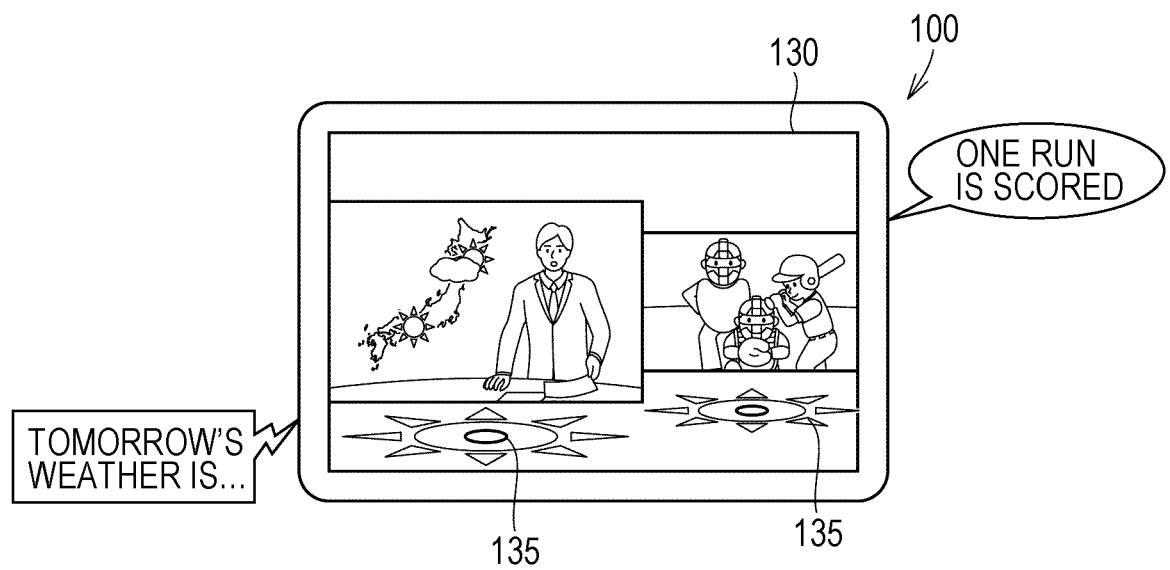
FIG. 28 is an image diagram illustrating a third operation overview of a light output system 100 according to the eleventh embodiment.

Alternatively, as illustrated in FIG. 26, the CPU 110 of the light output system 100 may cause the LED light 135 to emit light in accordance with audio corresponding to the image of any screen while displaying two screens on the display 130. As illustrated in FIG. 27, a plurality of LED lights 135 and 135 may be disposed outside the display 130 below each of the two screens. Alternatively, as illustrated in FIG. 28, a form in which part of the inside of the display 130 below each of the two screens may be caused to emit light.

It becomes easier to recognize which screen audio is being output. Alternatively, one audio may be played and the LED light 135 may be lit or blinked in synchronization with the audio outputted without outputting the other audio. Alternatively, the LED light 135 may be lit or blinked in accordance with the audio while outputting audio of the content of another application, or the LED light 135 may be lit or blinked in synchronization with the audio in a case where the audio was output without outputting the audio of the content of another application.

Twelfth Embodiment

Figures 29, 30:
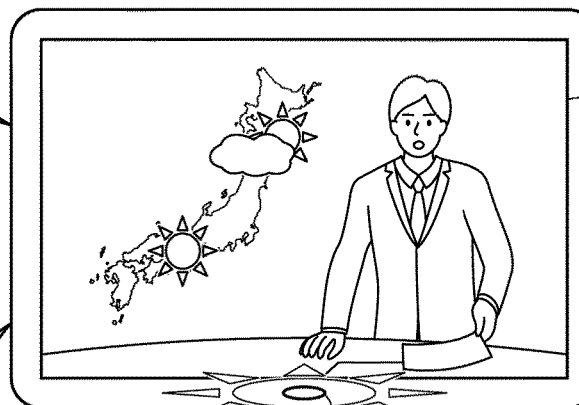
FIG. 29 is an image diagram illustrating an operation overview of a light output system 100 according to a twelfth embodiment.
FIG. 30 is an image diagram illustrating a theme database 127 according to the twelfth embodiment.

Alternatively, as illustrated in FIG. 29, the CPU 110 of the light output system 100 may receive information of the next program and cause the speaker 170 to output the next program name. In this embodiment, the memory 120 of the light output system 100 may store a theme database 127 instead of the repetition database 121 or in addition to the repetition database 121. More specifically, with reference to FIG. 30, the theme database 127 stores a relationship between the theme, the genre, the intensity of light, the color (luminance) of light, and the blinking tempo of light.

Figure 31:
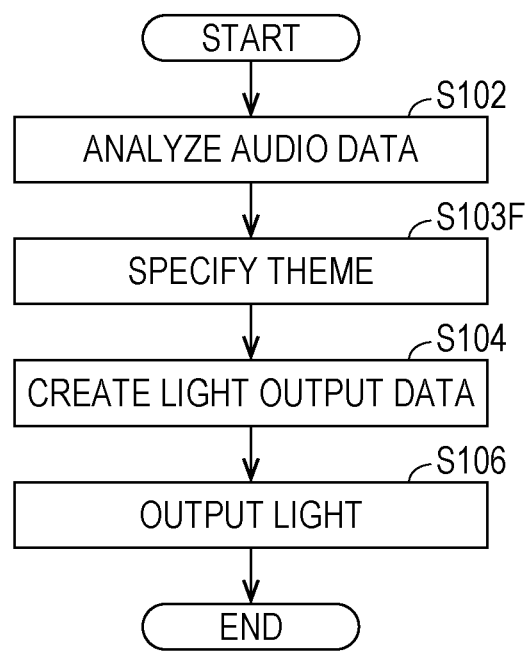
FIG. 31 is a flowchart illustrating information processing in the light output system 100 according to the twelfth embodiment.

In the following, information processing of the light output system 100 according to this embodiment will be described with reference to FIG. 31. The CPU 110 of the light output system 100 executes the following processing when outputting the second audio.

First, as illustrated in FIG. 4(A), the CPU 110 acquires information on the next program as the second audio from data acquired from the outside. The CPU 110 analyzes the second audio (step S102). In particular, the CPU 110 specifies the theme and genre of the next program from the data (step S103F). The data from the server may include the theme and genre, or the theme and genre may be determined from the data received by the CPU 110.

The CPU 110 specifies an output method of light corresponding to the analyzed audio (step S104). In this embodiment, the CPU 110 refers to the theme database 127 and specifies an output method of audio and an output method of light according to the genre of the next program.

The CPU 110 causes the speaker 170 to output audio based on the determined output method of audio and causes the LED light 135 (Step S106) to emit light based on the determined output method of light, as illustrated in FIG. 4(B).

The user can grasp the theme and genre of the next program.

Thirteenth Embodiment

Alternatively, as illustrated in FIG. 32, the CPU 110 of the light output system 100 may output audio or light when detecting that the user in the vicinity of the light output system 100 is facing the light output system 100 based on image data from the camera 195.

Figure 33:
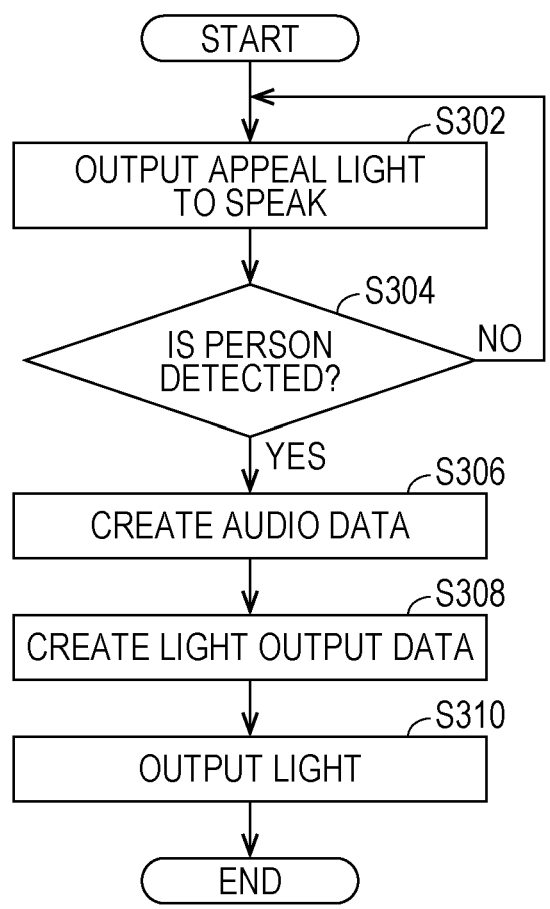
FIG. 33 is a flowchart illustrating information processing in the light output system 100 according to the thirteenth embodiment.

More specifically, as illustrated in FIG. 33, upon acquiring data to be output, the CPU 110 causes the LED light 135 to output light to indicate that audio to be output is accumulated (step S302). The CPU 110 searches for the user around the light output system 100 through the camera 195 (step S304).

Upon detecting that the user is present around the light output system 100 based on the image from the camera 195 (in the case of YES in step S304), the CPU 110 creates audio data from the acquired data (step S306).

The CPU 110 analyzes the audio data and specifies an output method of light corresponding to the analyzed audio (step S308). The CPU 110 causes the speaker 170 to output audio based on the determined output method of audio and causes the LED light 135 to emit light based on the determined output method of light as illustrated in FIG. 4(B) (step S310).

Thus, when it is convenient for the user, the light output system 100 outputs audio. The user feels sense of life of the light output system 100, that is, the user feels as if the light output system 100 is thinking about the user.

Fourteenth Embodiment

Figure 34:
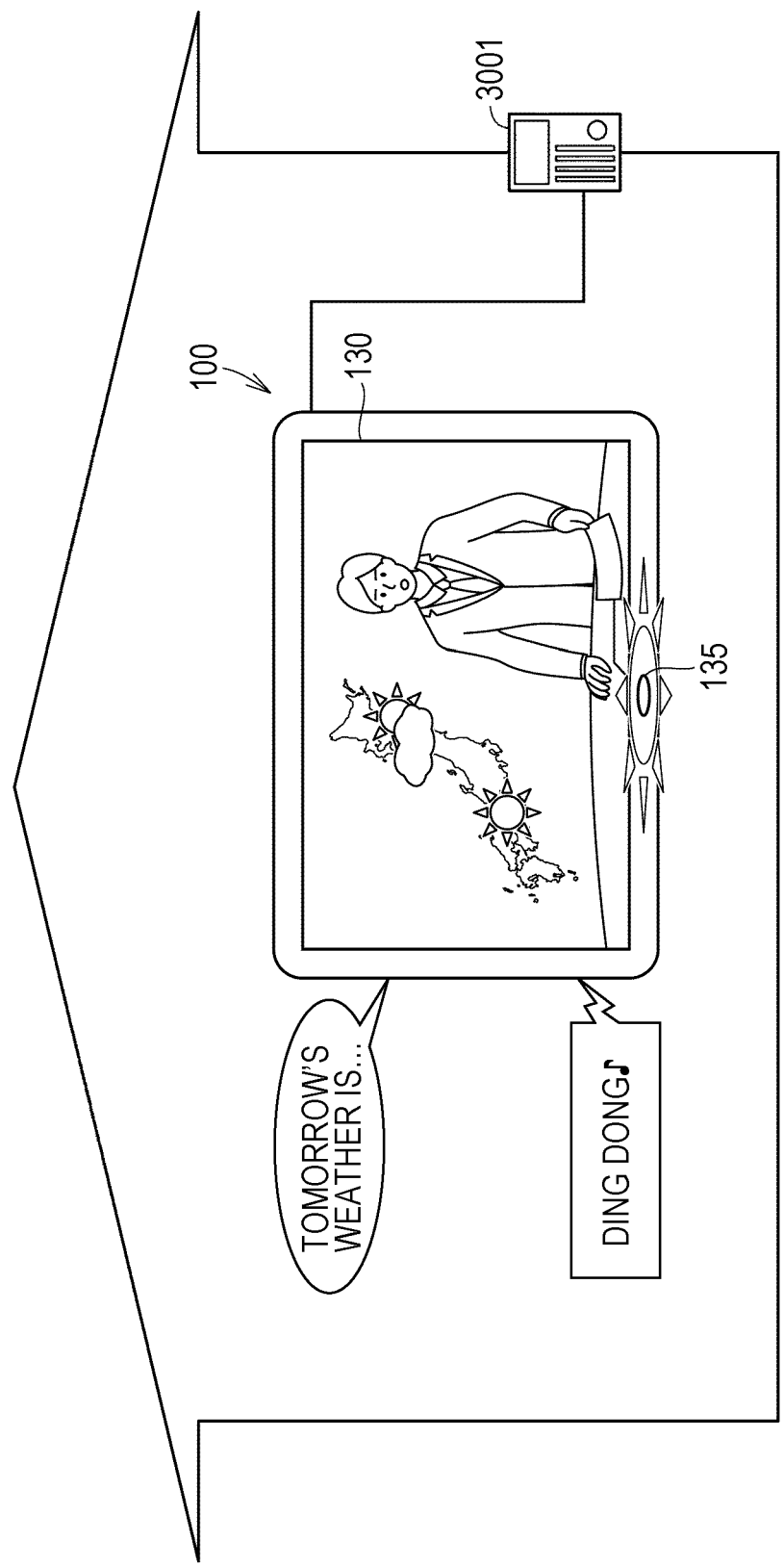
FIG. 34 is an image diagram illustrating a first operation overview of the light output system 100 according to a fourteenth embodiment.

Alternatively, as illustrated in FIG. 34, the light output system 100 may be connected to other electrical devices such as an interphone 3001. When the light output system 100 outputs audio data input from the interphone 3001, the light output system 100 may output light in accordance with the audio.

Figure 35:
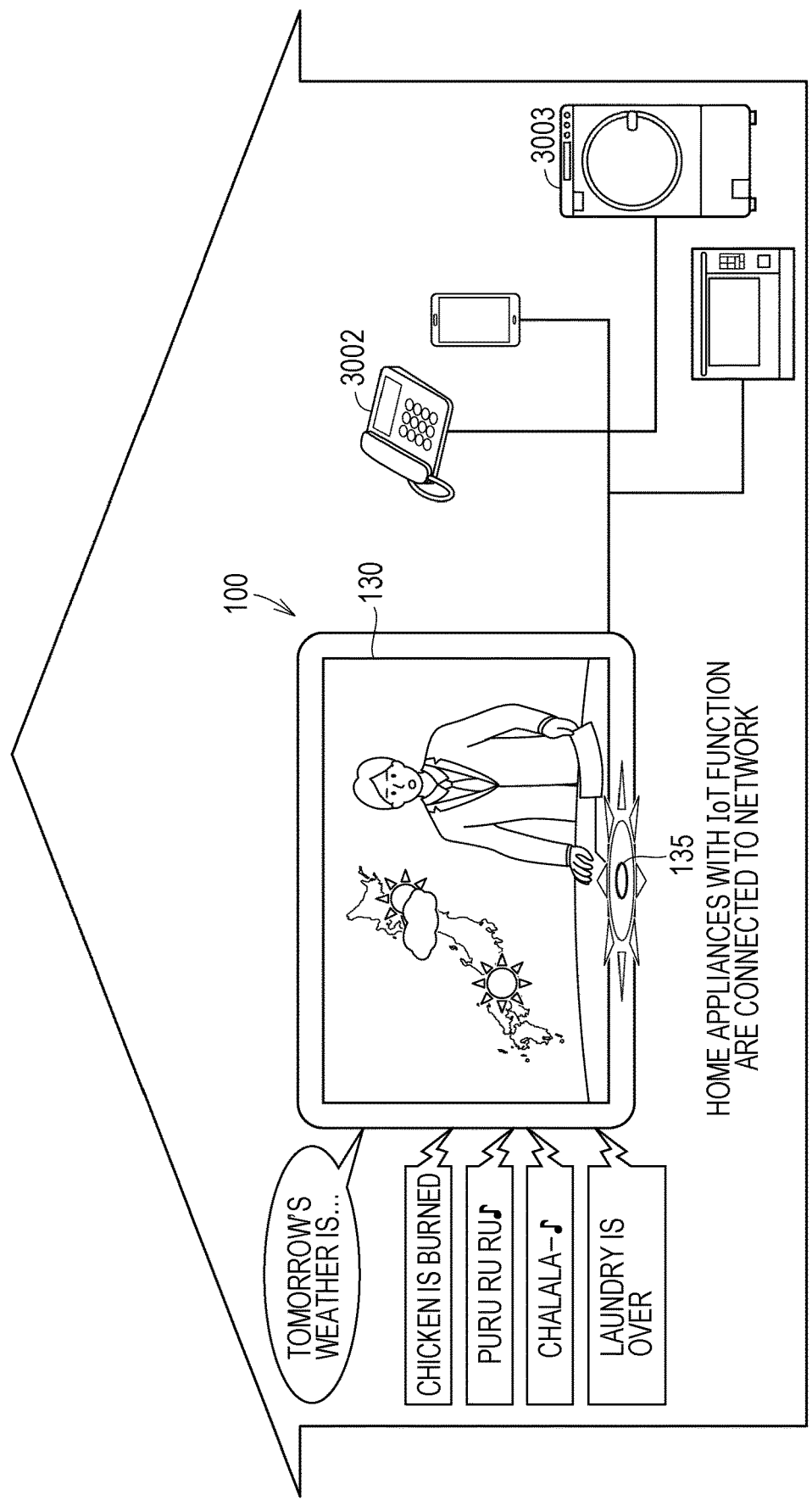
FIG. 35 is an image diagram illustrating a second operation overview of the light output system 100 according to the fourteenth embodiment.

Alternatively, as illustrated in FIG. 35, the light output system 100 may be connected to other electrical devices such as a telephone 3002 and a washing machine 3003. When the light output system 100 outputs audio data input from the telephone 3002 or the washing machine 3003, the light output system 100 may output light in accordance with the audio.

The electric device is not limited to the interphone 3001, the telephone 3002, or the washing machine 3003, but may be home appliances such as microwave ovens, air conditioners, refrigerators, vacuum cleaners, air purifiers, humidifiers, dehumidifiers, rice cookers, lighting, audio and visual (AV) equipment such as a television set, a hard disk recorder, a projector, and a music player, and housing equipment such as built-in lighting, solar power generator, water heater, and hot water washing toilet seat controller.

Thus, it is possible for the user to reduce the possibility of misunderstanding the notification from the electric device as audio in the television program such as a drama. It is possible to avoid hiding video of the television program such as a drama by a dialog box for informing that it is a notification from the electric device.

Fifteenth Embodiment

Figure 36:
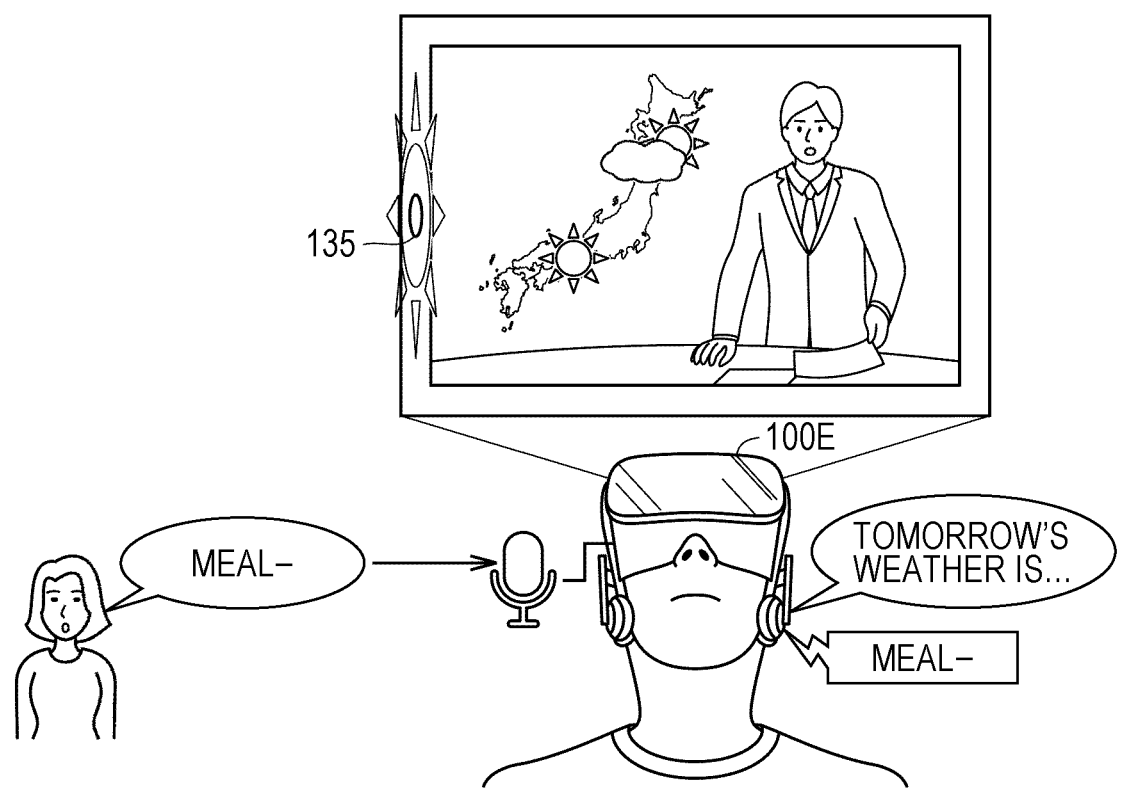
FIG. 36 is an image diagram illustrating an operation overview of the light output system 100 according to a fifteenth embodiment.

Also, the light output system 100 may be another type of display. For example, it may be a goggle type display 100E as illustrated in FIG. 36. The light output system 100 outputs audio from a headphone as the speaker 170 while displaying video on the display 130. In particular, in this embodiment, the CPU 110 of the light output system 100 acquires audio outside the light output system 100 from the microphone 180 and causes the display 130 or the LED light 135 to light up or blink in accordance with the audio while outputting the audio from the speaker 170 of the headphone.

It is needless to say that the CPU 110 of the light output system 100 may acquire external audio from the server or the like through the communication interface 160 and may cause the display 130 or the LED light 135 to light up or blink in accordance with the audio while outputting the audio from the speaker 170 of the headphone.

Thus, it can be recognized that audio different from the content being watched is being output.

Sixteenth Embodiment

Figure 37:
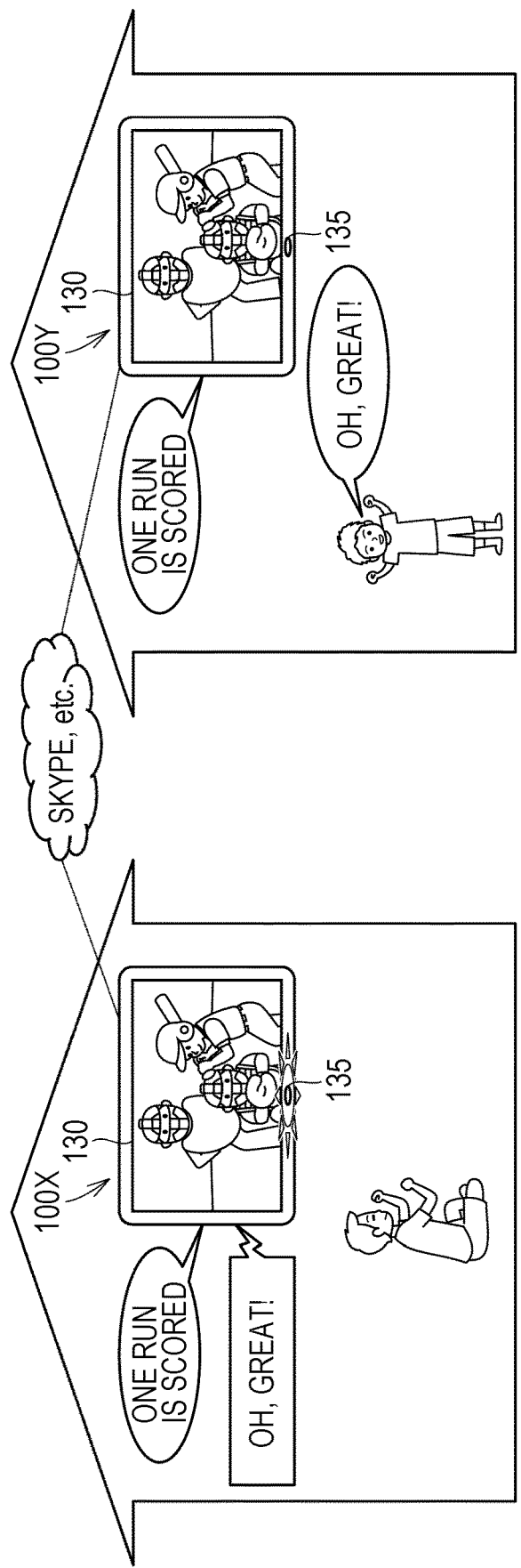
FIG. 37 is an image diagram illustrating a first operation overview of the light output system 100 according to a sixteenth embodiment.

The light output system 100 may be one that communicates with other devices. For example, as illustrated in FIG. 37, in this embodiment, the light output system 100 is a television 100X and is configured to be capable of communicating with another television 100Y. Each of the televisions 100X and 100Y as the light output system 100 outputs audio of the television program as first audio while outputting video of the television program.

In this embodiment, one CPU 110 of the television 100X and 100Y acquires a user's uttered voice through the microphone 180 and transmits the user's uttered voice to the other television through the communication interface 160. Then, the CPU 110 receives the user's uttered voice from the other television via the communication interface 160 and causes the LED light 135 to light up or blink in accordance with the uttered voice while outputting the uttered voice as second sound from the speaker 170. The light output system 100 may exchange uttered voice of two users between two televisions or may exchange more uttered voice of users between more televisions.

Figure 38:
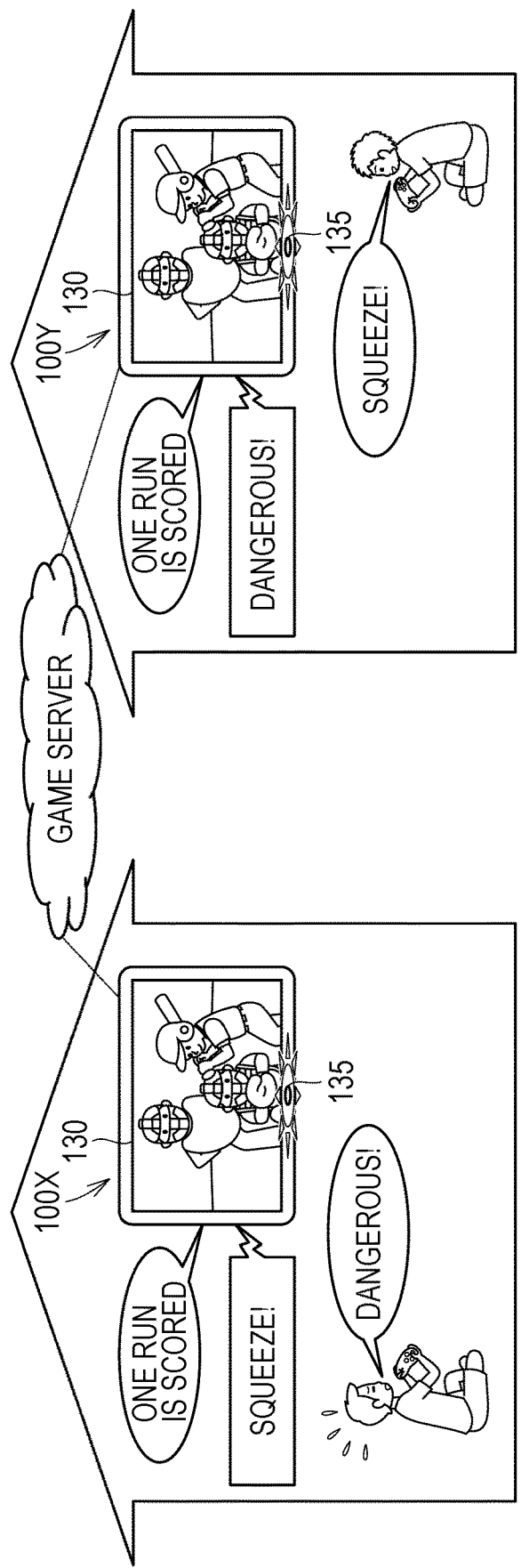
FIG. 38 is an image diagram illustrating a second operation overview of the light output system 100 according to the sixteenth embodiment.

As illustrated in FIG. 38, the CPU 110 is not limited to a form of outputting television broadcast, and may cause the LED light 135 to light up or blink in accordance with the uttered voice while outputting the user's uttered voice as the second audio from the speaker 170 during the game.

Thus, it becomes easier to distinguish audio of the program or the game from audio of a counterpart. Also, there are cases where the user can feel the counterpart close to him or her. Also, it is possible to avoid hiding the television program such as the drama and video of the game by the dialog box for notifying that they are audio from the other party.

Seventeenth Embodiment

Alternatively, as illustrated in FIG. 39, in a case where an external amplifier 300X is connected to its own audio signal output interface, the light output system 100 may handle audio output from the external amplifier 300X as second audio. That is, the CPU 110 of the light output system 100 may determine whether or not the external amplifier 300X is connected, and may cause the LED light 135 to light up or blink in accordance with the sound output from the external amplifier 300X. Thus, it is possible to visually recognize where audio is output from.

Eighteenth Embodiment

Alternatively, as illustrated in FIG. 40, the light output system 100 may cause audio data from a terminal 300Y such as a smartphone from the speaker 170 through bluetooth or WiFi to be output as second audio. That is, the CPU 110 causes the display 130 or the LED light 135 to light up or blink in accordance with the audio while outputting the audio from the terminal 300Y from the speaker 170. As described above, the CPU 110 of the light output system 100 may receive audio data from the server or the like through the communication interface 160 and cause the display 130 or the LED light 135 to light up or blink in accordance with the audio while outputting the audio from the speaker 170. It becomes easy to clearly distinguish audio of the program from audio of an application of the smartphone 300.

Nineteenth Embodiment

Alternatively, as illustrated in FIG. 41, the light output system 100 may have a timer function. The CPU 110 of the light output system 100 causes the speaker 170 to output the audio of the television program as first audio while outputting video of the television program on the display 130.

In the present embodiment, the CPU 110 of the light output system 100 causes the LED light 135 to light up or blink in accordance with the second audio while outputting audio relating to the timer 198 as the second audio from the speaker 170.

More specifically, in this embodiment, instead of the repetition database 121, or in addition to the repetition database 121, the memory 120 of the light output system 100 may store the timer database 128.

More specifically, with reference to FIG. 42, the timer database 128 stores a relationship between the remaining time of the timer 198, the intensity of light, the color (luminance) of light, and the blinking tempo of light.

Figure 43:
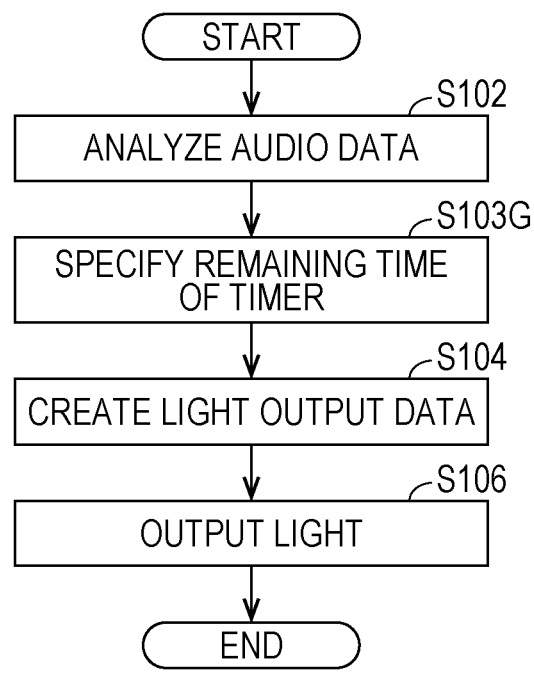
FIG. 43 is a flowchart illustrating information processing in the light output system 100 according to the nineteenth embodiment.

In the following, with reference to FIG. 43, information processing of the light output system 100 according to this embodiment will be described. The CPU 110 of the light output system 100 executes the following processing when outputting the second audio.

First, the CPU 110, as illustrated in FIG. 4(A), analyzes the second audio (step S102). Then, the CPU 110 acquires the remaining time of the timer 198 (step S103G).

The CPU 110 specifies an output method of light corresponding to the analyzed audio (step S104). In this embodiment, the CPU 110 refers to the timer database 128 and specifies the output method of audio and the output method of light.

The CPU 110 causes the speaker 170 to output audio based on the determined output method of audio and causes the LED light 135 to emit light based on the determined output method of light as illustrated in FIG. 4(B) (step S106).

Thus, it becomes easy for the user to observe notification of the timer.

Twentieth Embodiment

Alternatively, as illustrated in FIG. 44, when an automatic channel selection of the channel is completed, the CPU 110 of the light output system 100 outputs a message that the automatic channel selection is completed, a television program name to be output from the speaker 170, and the like, and causes the LED light 135 to light up or blink in accordance with the message.

Alternatively, during the automatic channel selection of the channel, the CPU 110 of the light output system 100 outputs a message that the automatic channel selection is in progress from the speaker 170, and causes the LED light 135 to light up or blink in accordance with the message.

Alternatively, when the automatic channel selection of the channel is started, the CPU 110 of the light output system 100 outputs a message to start automatic channel selection, and the like from the speaker 170, and causes the LED light 135 to light up or blink in accordance with the message.

Thus, it becomes easy for the user to recognize that the automatic channel selection has been executed or the automatic channel selection has been completed.

Twenty-First Embodiment

Alternatively, when outputting sub audio, the CPU 110 of the light output system 100 may handle the sub audio as second audio. That is, the CPU 110 may cause the LED light 135 to emit light in accordance with the sub audio. The user can easily recognize output of the sub audio.

Alternatively, when outputting a translation, the CPU 110 of the light output system 100 may treat the translation as the second audio. Then, the CPU 110 may cause the LED light 135 to emit light in accordance with the translated audio. The user can easily recognize output of the translated audio. In particular, when translating by a translation function of the light output system 100, since the user can recognize that the audio of translation by the light output system 100 is being output, the possibility of being misunderstood as translation by the broadcasting station can be reduced.

Alternatively, the CPU 110 of the light output system 100 may automatically read Twitter (registered trademark) and handle the read-aloud audio as the second audio. Then, the CPU 110 may cause the LED light 135 to emit light in accordance with the read-aloud audio. It becomes easier for the user to recognize that the text of Twitter (registered trademark) is being subjected to audio output.

Twenty-Second Embodiment

The techniques of the first to twenty-first embodiments can also be utilized for the following light output system 100. In this embodiment, the light output system 100 is a television, and outputs light in a different manner for each operation.

For example, the memory 120 of the light output system 100 stores an operation pattern database 1201 as illustrated in FIG. 45. The operation pattern database 1201 includes a correspondence relationship between an activation trigger, presence and absence of screen interlock, the color of light, and the output method of light for each operation. By referring to the operation pattern database 1201, the CPU 110 of the light output system 100 causes the LED light 135 to light up or blink according to its own operation and surrounding circumstances.

(1) When the light output system 100 is activated, the light output system 100 executes a "wake up" operation. Specifically, when the light output system 100 is activated, the CPU 110 causes small light to be slowly generated on the display 130, and causes the screen to be started from the light. Alternatively, the CPU 110 causes video to be displayed on the display 130 while slowly increasing intensity of the LED light 135.

(2) When the power of the light output system 100 is turned OFF, the light output system 100 executes a "sleep" operation. Specifically, when the power of the light output system 100 is turned OFF, the CPU 110 causes the display to gradually diminish light little by little on 130 while erasing the screen. Alternatively, the CPU 110 erases video on the display 130 while slowly weakening intensity of the LED light 135.

(3) The light output system 100 executes a "react" operation when receiving an instruction from a remote controller or a main body operation unit. Specifically, the CPU 110 causes light to be suddenly displayed on a part of the display 130 or the LED light 135 to suddenly glow when receiving the instruction from the remote controller or the main body operation unit.

Figure 46:
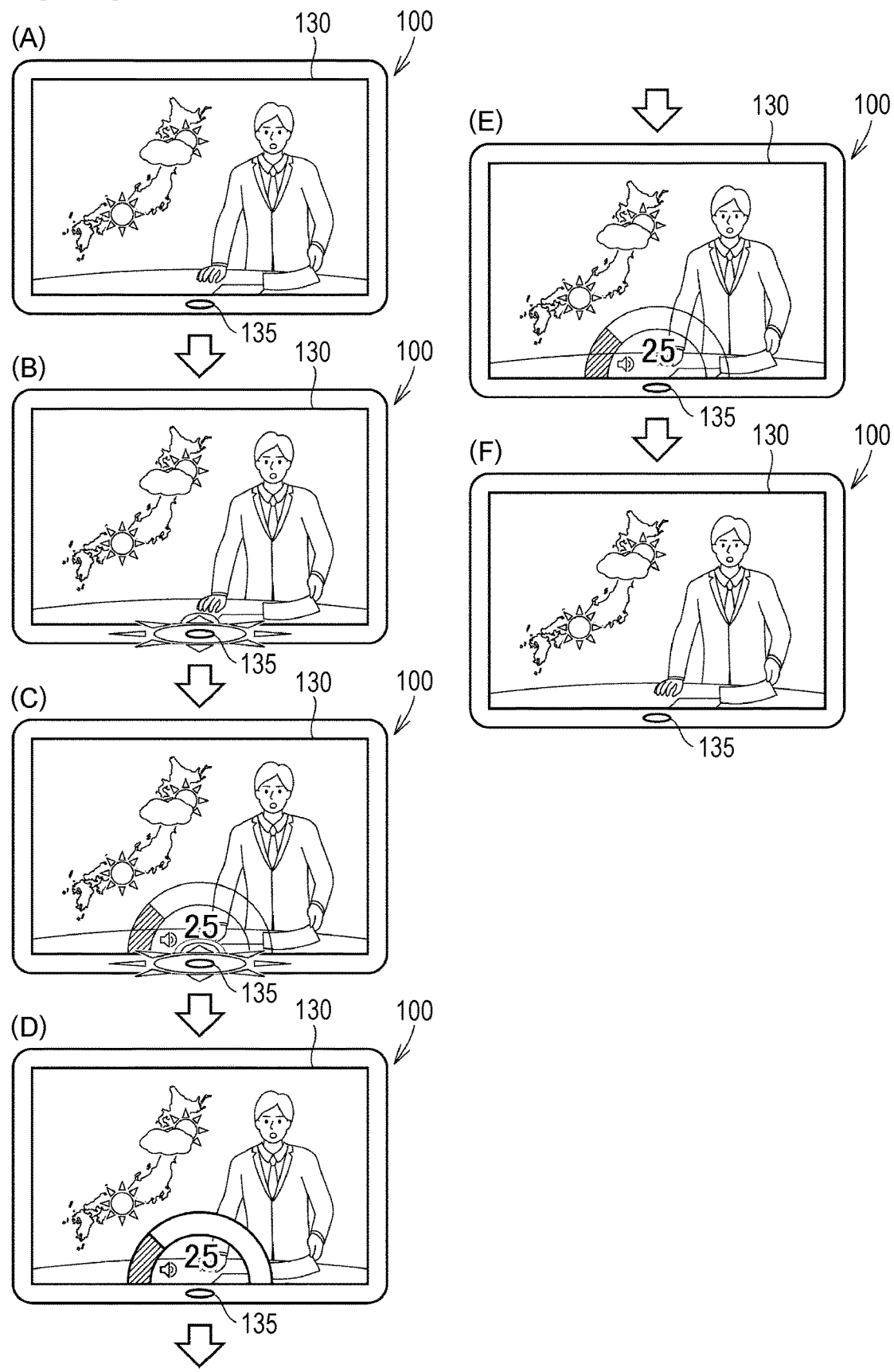
FIG. 46 is an image diagram illustrating a first operation overview of sound volume change of the light output system 100 according to a twenty-second embodiment.
Figure 47:
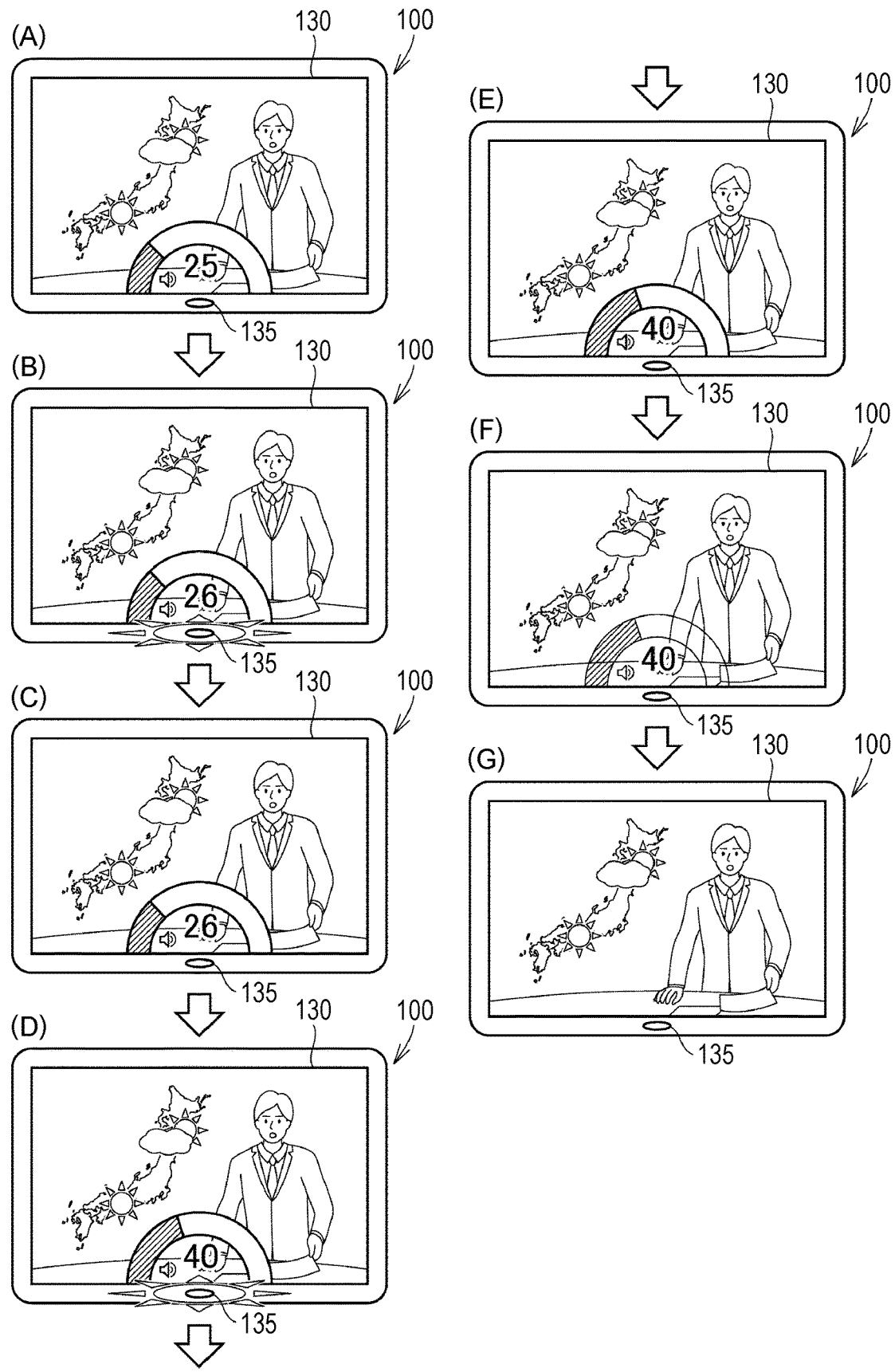
FIG. 47 is an image diagram illustrating a second operation overview of sound volume change of the light output system 100 according to the twenty-second embodiment.

(4) The light output system 100 executes a "react (interlock)" operation when receiving an instruction to change the sound volume. Specifically, the CPU 110 displays an image for indicating the sound volume on a part of the display 130 when receiving the instruction to change the sound volume from the remote controller or the main body operation unit. More specifically, the CPU 110 displays semicircular indicators as illustrated in FIGS. 46 and 47 at the right-and-left central portion of the lower portion of the display 130. In other words, a plurality of bars indicating the sound volume are arranged in a semicircular shape or a fan shape. Then, as the sound volume increases, the CPU 110 displays more bars on the display 130 from left to right.

FIG. 46 is an image diagram illustrating screen transition of the display 130 in a case where an instruction to change the sound volume is input only once. FIG. 47 is an image diagram illustrating the screen transition of the display 130 in the case where instructions to increase the sound volume are continuously input. As illustrated in FIGS. 46 and 47, the CPU 110 changes the number of radially arranged bars in accordance with the changed sound volume, such as a speedometer of an automobile or the like, on the display 130.

More specifically, when the user presses the instruction to raise the sound volume once, the CPU 110 displays an indicator of the changed sound volume for a predetermined time and then turns off the indicator. When the user further presses the instruction to raise the sound volume before the indicator disappears, the CPU 110 changes the display as it is without erasing the image of the sound volume indicator. When the user long presses an instruction to raise the sound volume, the CPU 110 continuously changes the image of the sound volume indicator without erasing the image.

Here, it is preferable that every time the user presses a button for change the sound volume, a part or the whole of the LED light 135 or the display 130 glows. Alternatively, it is preferred that a part or the whole of the LED light 135 or the display 130 is glowing while the user is pressing the button for change the sound volume.

Since an operation for lowering the sound volume is the same as the operation for raising the sound volume, the description will not be repeated here.

(5) The light output system 100 executes a "react (interlock)" operation when receiving an instruction for changing a channel. Specifically, the CPU 110 causes an image or text indicating a channel to be displayed on a part of the display 130 when receiving the instruction to change the channel from the remote controller or the main body operation unit. More specifically, as illustrated in FIGS. 48, 49, and 50, the CPU 110 causes the changed channel to be displayed at the right-and-left central portion of the lower portion of the display 130.

Figure 48:
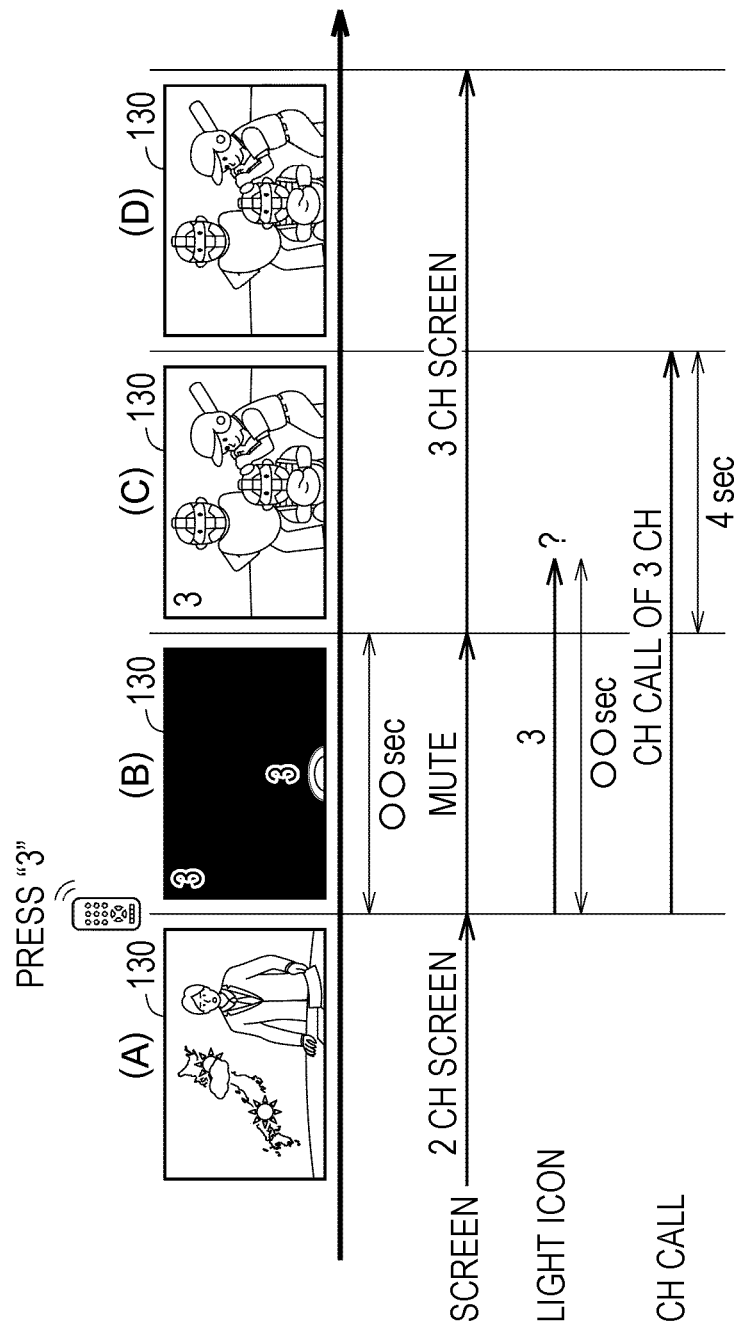
FIG. 48 is an image diagram illustrating a first operation overview of channel change of the light output system 100 according to the twenty-second embodiment.

FIG. 48 is an image diagram illustrating the screen transition of the display 130 in a case where a channel designation instruction is input. The CPU 110 causes the display 130 to display the changed channel at the lower portion, display the changed channel and program information at the upper portion, switch the entire screen to black, and then display the image of the changed channel.

Figure 49:
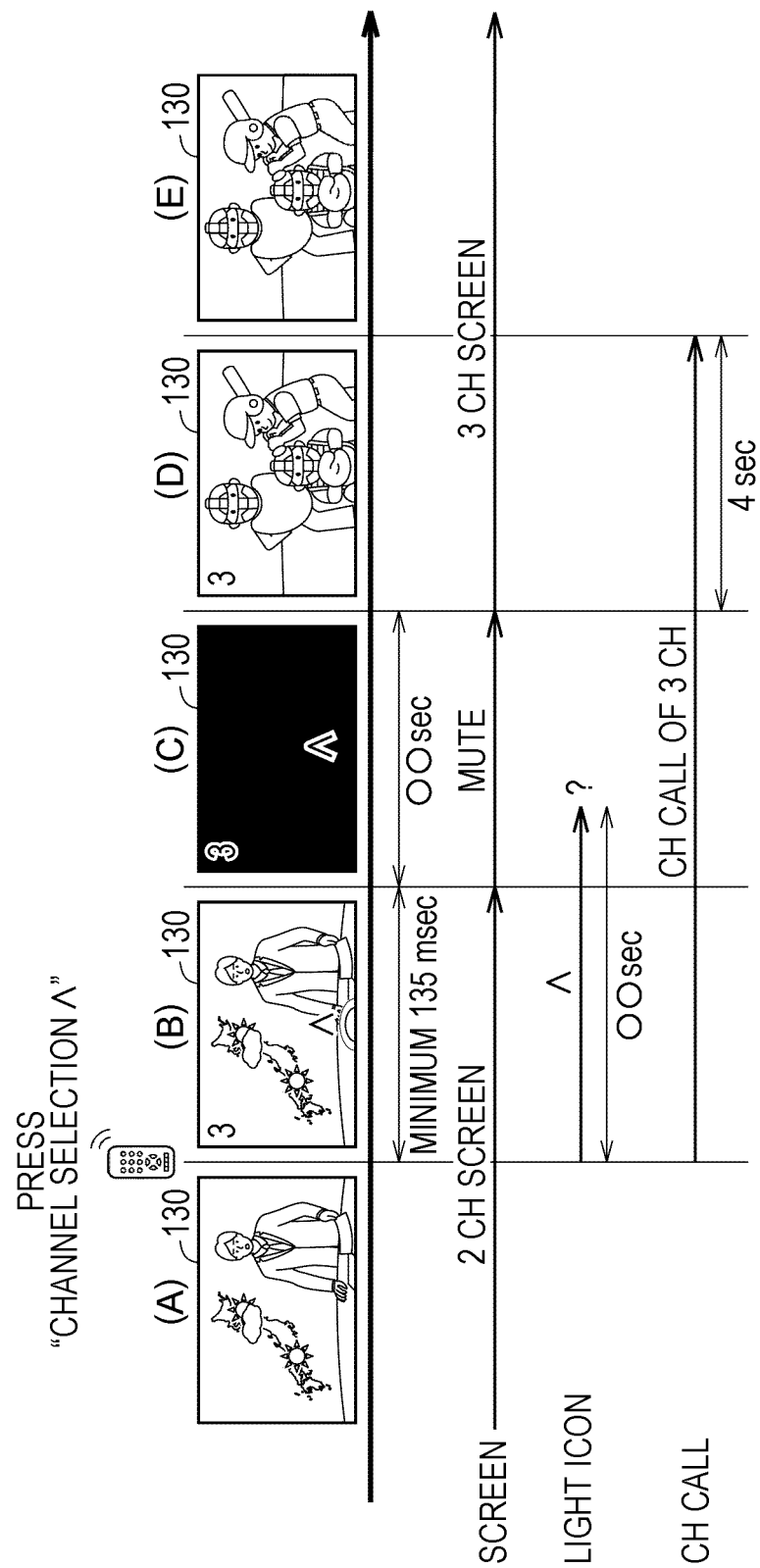
FIG. 49 is an image diagram illustrating a second operation overview of channel change of the light output system 100 according to the twenty-second embodiment.

FIG. 49 is an image diagram illustrating the screen transition of the display 130 in a case where an instruction to up the channel is input. The CPU 110 causes the display 130 to display an image illustrating channel up in the lower portion, display the changed channel and program information on the upper left side, switch the entire screen to black after a predetermined time, and then display the image of the changed channel.

Figure 50:
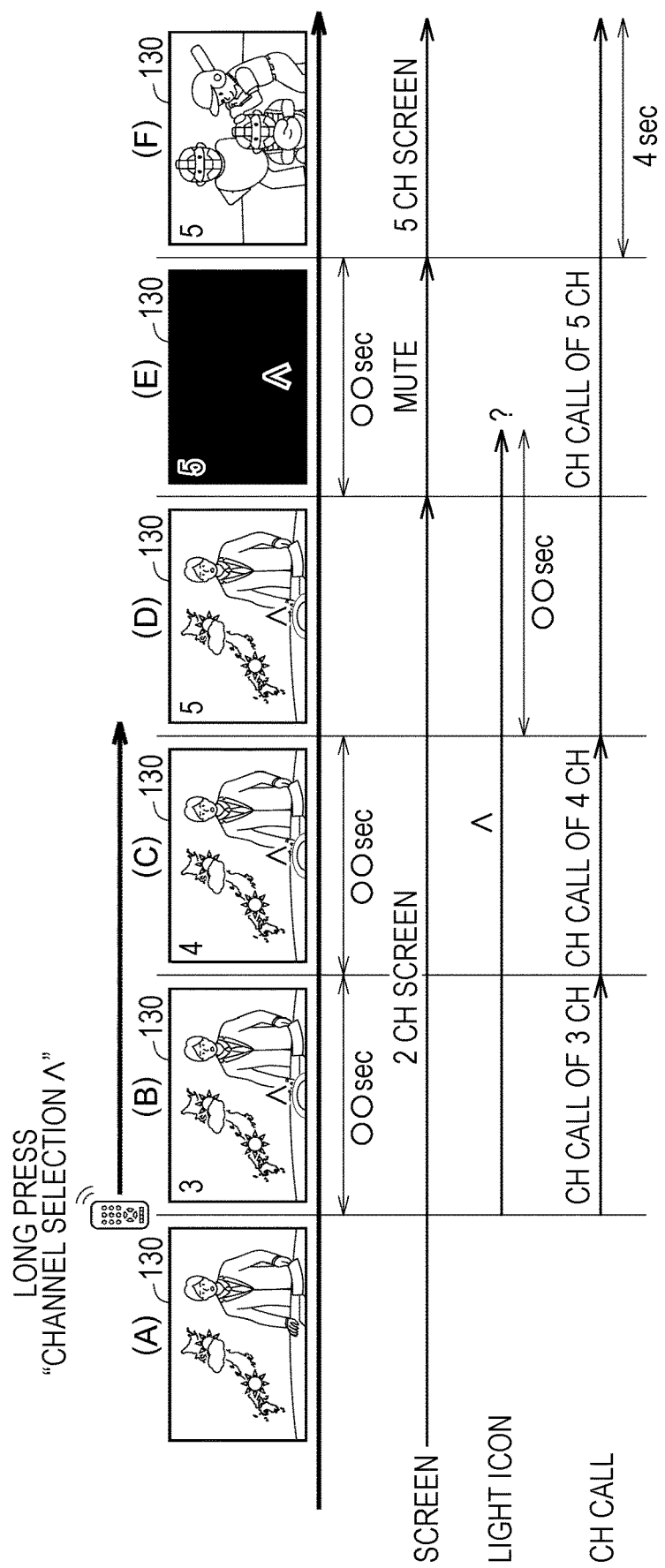
FIG. 50 is an image diagram illustrating a third operation overview of channel change of the light output system 100 according to the twenty-second embodiment.

FIG. 50 is an image diagram illustrating the screen transition of the display 130 in a case where a channel up key is pressed for a long time. The CPU 110 causes the display 130 to display an image indicating that the channel is being up after the change in the lower portion and to display the changed channel and program information on the upper left side. While the channel up key is being pressed, the CPU 110 switches the channel and program information of the upper portion while displaying the image illustrating that the channel is being up after the change in the lower portion. When the channel up key is no longer pressed, the CPU 110 switches the whole of the screen to black, and then displays the image of the changed channel on the display 130.

Here, it is preferable that a part or the whole of the LED light 135 or the display 130 glows each time the user presses a button for changing the channel. Alternatively, it is preferred that a part or the whole of the LED light 135 or the display 130 glows while the user presses the button for changing the channel.

(6) The light output system 100 executes a "listen" operation when spoken to by the user. Specifically, the CPU 110 causes a part of the display 130 or the LED light 135 to blink at a constant rhythm such as giving a response when detecting audio from the user through the microphone 180.

(7) The light output system 100 executes a "propose" operation to the user. Specifically, while outputting proposal information from the speaker 170 to the user, the CPU 110 causes the part of the display 130 or the LED light 135 to output first so as to mix lights of various pale colors together, thereafter weaken light, and then strengthen light of the standard color. For example, it is preferable to fluently and softly blink light or to make light reciprocate.

(8) The light output system 100 performs a "speak" operation to the user. Specifically, the CPU 110 causes the part of the display 130 or the LED light 135 to blink at a rhythm in accordance with a conversation while outputting the conversation from the speaker 170 to the user. For example, it is preferable to fluently and softly blink light or to make light reciprocate.

Figure 51:
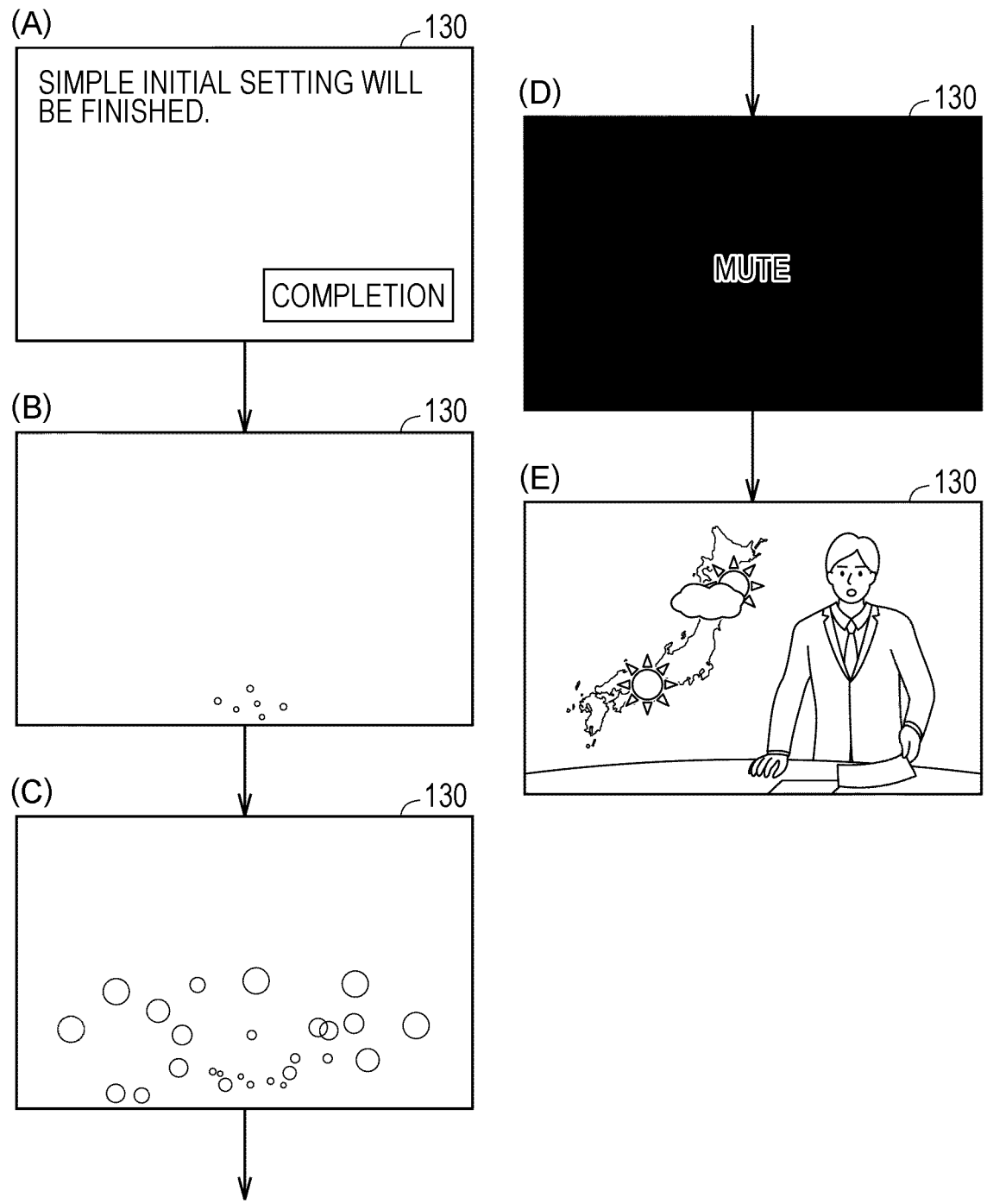
FIG. 51 is an image diagram illustrating an operation overview of "encounter" of the light output system 100 according to the twenty-second embodiment.

(9) The light output system 100 performs an "encounter" operation at the time of initial setting. Specifically, when initial setting is completed, the CPU 110 causes the display 130 to display video for several seconds. For example, as illustrated in FIG. 51, when the initial setting is completed, video in which bubbles spread is displayed. Alternatively, the CPU 110 may cause a part of the display 130 or the LED light 135 to output light when WiFi or bluetooth connection is completed.

Alternatively, when version upgrade of software is completed, the CPU 110 may cause the part of the display 130 or the LED light 135 to output light. Alternatively, the CPU 110 may cause the part of the display 130 or the LED light 135 to output light so that the power of the light output system 100 is not turned OFF by the user during version upgrade of software.

Figure 52:
FIG. 52 is an image diagram illustrating an operation overview of "notification" of the light output system 100 according to the twenty-second embodiment.

(10) The light output system 100 executes a "notification" operation when executing a reservation operation or a predetermined time before the reservation operation. Specifically, the CPU 110 causes the part of the display 130 or the LED light 135 to make an output similar to the "reaction (small)" or to make another lighting up or blinking operation. Thus, it is not necessary to disturb video at the time of notification. However, as illustrated in FIG. 52, the CPU 110 may cause the display 130 to display text of information of the notification or cause the speaker 170 to output information of the notification as audio.

Twenty-Third Embodiment

Figure 53:
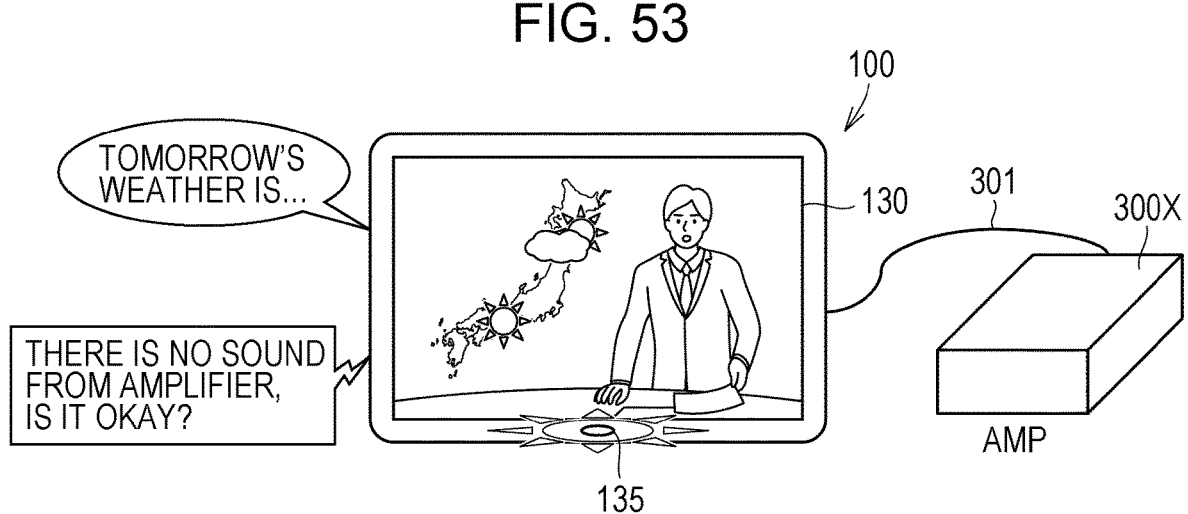
FIG. 53 is an image diagram illustrating an operation overview of the light output system 100 according to a twenty-third embodiment.

In addition, as illustrated in FIG. 53, it is preferable that the CPU 110 of the light output system 100 detects that no audio is output from an amplifier 300X even though the external amplifier 300X is connected, and causes the speaker 170 to output error information as the second audio or a part of the display 130 or the LED light 135 to output light in accordance with the audio. Thus, it becomes easy for the user to observe an unintended output state.

Twenty-Fourth Embodiment

Alternatively, as illustrated in FIG. 54, audio and light may be output when the light output system 100 is automatically turned off by using the timer 198 or when the light output system 100 is shifted to a sleep state by the timer, or the like. More specifically, it is preferable that the CPU 110 detects that the surroundings have become dark or the user has gone away, and causes a part of the display 130 or the LED light 135 to output light in accordance with audio of "The power will be turned off" while causing the speaker 170 to output the audio as the second audio. Thus, it becomes easy for the user to observe that the power is turned off or the timer is shifted to a sleep state.

Twenty-Fifth Embodiment

Alternatively, as illustrated in FIG. 55, it is preferable that when an emergency warning broadcast is received through the antenna 150 or the communication interface 160, the CPU 110 of the light output system 100 causes a part of the display 130 or the LED light 135 to output light in accordance with the audio while outputting that effect as the second audio from the speaker 170. Thus, it becomes easy for the user to recognize that new emergency information has been received.

Twenty-Sixth Embodiment

Alternatively, as illustrated in FIG. 56, when the CPU 110 of the light output system 100 outputs a recorded program, the CPU 110 of the light output system 100 may cause the part of the display 130 or the LED light 135 to output light in accordance with the audio of the program. Or, conversely, when the CPU 110 of the light output system 100 outputs a program that is not recorded, the CPU 110 of the light output system 100 may cause the part of the display 130 or the LED light 135 to output light in accordance with the sound of the program. This can reduce the possibility of the user misunderstanding LIVE information when a recording is output.

Twenty-Seventh Embodiment

Alternatively, the CPU 110 of the light output system 100 may output light according to a communication amount. In this embodiment, instead of the repetition database 121 or in addition to the repetition database 121, the memory 120 of the light output system 100 may store a transmission and reception amount database 1202. More specifically, with reference to FIG. 57, the transmission and reception amount database 1202 stores a relationship between a data transmission and reception amount, the intensity of light, the color (luminance) of light, and the tempo of blinking light.

Figures 58, 59:
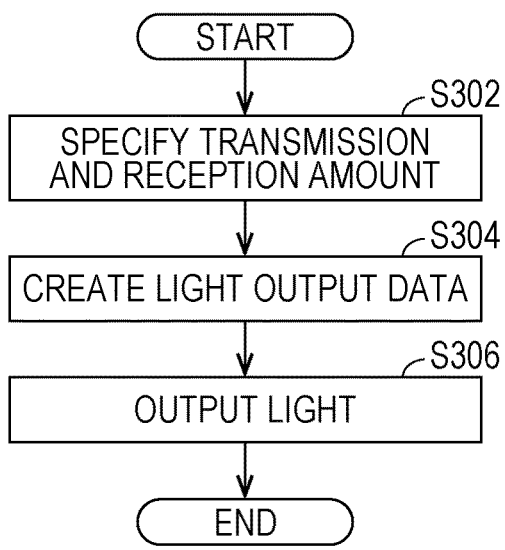
FIG. 58 is a flowchart illustrating information processing in the light output system 100 according to the twenty-seventh embodiment.
FIG. 59 is an image diagram illustrating a radio wave intensity database 1203 according to a twenty-eighth embodiment.

With reference to FIG. 58, the light output system 100 according to this embodiment executes the following information processing. First, the CPU 110 acquires the data transmission and reception amount (step S302). The CPU 110 refers to the transmission and reception amount database 1202 and specifies an output method of light corresponding to the transmission and reception amount (step S304). Based on the specified output method of light, the CPU 110 causes the part of the display 130 or the LED light 135 to emit light (step S306).

Twenty-Eighth Embodiment

Alternatively, the CPU 110 of the light output system 100 may output light according to the radio wave intensity. That is, instead of the repetition database 121 or in addition to the repetition database 121, the memory 120 of the light output system 100 may store a radio wave intensity database 1203. More specifically, with reference to FIG. 59, the radio wave intensity database 1203 stores a relationship between the intensity of radio wave for radio communication, the intensity of light, the color (luminance) of light, and the blinking tempo of light.

With reference to FIG. 60, the light output system 100 according to this embodiment executes the following information processing. First, the CPU 110 measures the intensity of radio wave via the communication interface 160 (step S302). The CPU 110 refers to the radio wave intensity database 1203 and specifies an output method of light corresponding to the radio wave intensity (step S304). Based on the specified output method of light, the CPU 110 causes the part of the display 130 or the LED light 135 to emit light (step S306).

Twenty-Ninth Embodiment

Alternatively, the CPU 110 of the light output system 100 may output light according to a type of error. That is, instead of to the repetition database 121 or in addition to the repetition database 121, the memory 120 of the light output system 100 may store an error database 1204. More specifically, with reference to FIG. 61, the error database 1204 stores a relationship between the type of error, the intensity of light, the color (luminance) of light, and the blinking tempo of light. For example, the light output system 100 outputs weak blue light in a case where a level of abnormality is low and outputs strong red light when the level of abnormality is high.

The type of error is, for example, that a remote control number is incorrect, that a child lock is applied, and the like. Alternatively, the type of error includes a case where an abnormal value equal to or greater than a predetermined value or equal to or less than a predetermined value is set for various settings, and the like.

With reference to FIG. 62, the light output system 100 according to this embodiment executes the following information processing. First, the CPU 110 specifies the type of error through the communication interface 160 (step S302). The CPU 110 refers to the error database 1204 and specifies an output method of light corresponding to the type of error (step S304). Based on the specified output method of light, the CPU 110 causes the part of the display 130 or the LED light 135 to emit light (step S306).

Thirtieth Embodiment

Alternatively, the CPU 110 of the light output system 100 may output light according to the level of an emergency broadcast. That is, instead of the repetition database 121 or in addition to the repetition database 121, the memory 120 of the light output system 100 may store an abnormality level database 1205. More specifically, with reference to FIG. 63, the abnormality level database 1205 stores a relationship between the level of abnormality of situation, the intensity of light, the color (luminance) of light, and the blinking tempo of light.

Figures 63, 64, 65:
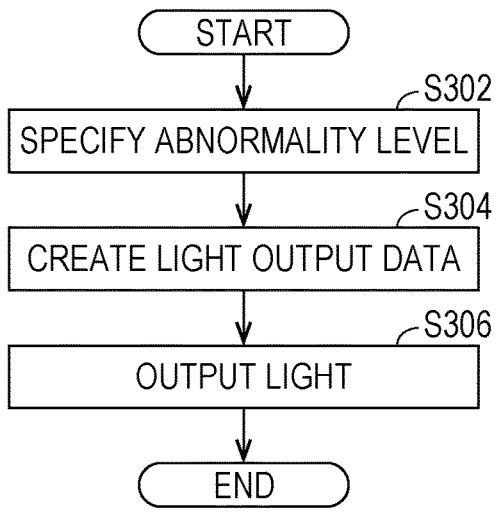
FIG. 63 is an image diagram illustrating an abnormality level database 1205 according to a thirtieth embodiment.
FIG. 64 is a flowchart illustrating information processing in the light output system 100 according to the thirtieth embodiment.
FIG. 65 is an image diagram illustrating a sound volume database 1206 according to a thirty-first embodiment.

With reference to FIG. 64, the light output system 100 according to this embodiment executes the following information processing. First, the CPU 110 specifies an abnormality level of an emergency situation based on the acquired emergency information, an address, a postal code, and the like of the light output system 100 (step S302). For example, the emergency level is specified based on the level of seismic intensity or the tsunami of the position of the light output system 100. Even with information of the tsunami, in a case where the position of the light output system 100 is far from the sea, conversely, matters that the degree of urgency is low may be output. The CPU 110 refers to the abnormality level database 1205 and specifies an output method of light corresponding to the emergency abnormality level (step S304). Based on the specified output method of light, the CPU 110 causes the part of the display 130 or the LED light 135 to emit light (step S306).

Thirty-First Embodiment

Alternatively, the CPU 110 of the light output system 100 may output light according to magnitude of sound volume being output by the light output system 100. That is, instead of the repetition database 121 or in addition to the repetition database 121, the memory 120 of the light output system 100 may store the sound volume database 1206. More specifically, with reference to FIG. 65, the sound volume database 1206 stores a relationship between a level of sound volume, the intensity of light, the color (luminance) of light, and the blinking tempo of light.

With reference to FIG. 66, the light output system 100 according to this embodiment executes the following information processing. First, the CPU 110 specifies the magnitude of sound volume being output by the light output system 100 (step S302). The CPU 110 refers to the sound volume database 1206 and specifies an output method of light corresponding to the sound volume (step S304). Based on the specified output method of light, the CPU 110 causes the part of the display 130 or the LED light 135 to emit light (step S306).

Thirty-Second Embodiment

Alternatively, the CPU 110 of the light output system 100 may output light according to surrounding brightness or the brightness of the display 130 by the light output system 100. That is, instead of the repetition database 121 or in addition to the repetition database 121, the memory 120 of the light output system 100 may store a brightness database 1207. More specifically, with reference to FIG. 67, the brightness database 1207 stores a relationship between a level of brightness, the intensity of light, the color (luminance) of light, and the blinking tempo of light.

With reference to FIG. 68, the light output system 100 according to this embodiment executes the following information processing. First, the CPU 110 specifies the brightness around the light output system 100 or the brightness of the display 130 (step S302). The CPU 110 refers to the brightness database 1207 and specifies an output method of light corresponding to current brightness (step S304). Based on the specified output method of light, the CPU 110 causes the part of the display 130 or the LED light 135 to emit light (step S306).

The brightness database 1207 may store a pitch and audio quality of audio corresponding to brightness. It is preferable that the CPU 110 outputs fun audio with a high pitch at a large sound volume from the speaker 170 when the surroundings are bright and outputs calm audio with a low pitch at a small sound volume from the speaker 170 when the surroundings are dark, on the basis of the brightness database 1207.

Thus, LED luminance varies depending on the circumstances, so that the user is less likely to feel uncomfortable. Also, since the sound volume and audio quality change according to brightness, comfort can be given to the user.

Thirty-Third Embodiment

Alternatively, in a case where automatic light control of the display 130 of the light output system 100 is enabled, the CPU 110 of the light output system 100 may cause the part of the display 130 or the LED light 135 to emit light according to intensity of the backlight. Thus, it becomes easy for the user to recognize that the automatic light control function is working.

Other Application Examples

One embodiment of the present invention can also be applied to a case where it is achieved by supplying a program to a system or an apparatus. By supplying a storage medium (or a memory) storing a program represented by software for achieving one aspect of the present invention to a system or an apparatus and reading out and executing the program code stored in the storage medium by a computer (or CPU or MPU) of the system or apparatus, it is also possible to enjoy the effect of one aspect of the present invention.

In this case, the program code itself read from the storage medium realizes the functions of the embodiments described above, and the storage medium storing the program code constitutes one aspect of the present invention.

It goes without saying that a case where not only the functions of the embodiments described above are realized by executing the program code read out by a computer but also an operating system (OS) or the like running on the computer performs a part or all of actual processing based on instructions of the program code and the functions of the embodiments described above are realized by the processing is also included.

Furthermore, it goes without saying that a case where after a program code read out from a storage medium is written into another storage medium provided in a function expansion board inserted into a computer or in a function expansion unit connected to the computer, a CPU or the like provided in the function expansion board or the function expansion unit performs a part or all of actual processing based on the instructions of the program code and the functions of the embodiments described above are realized by the processing is also included.

CONCLUSION

In the embodiments described above, the light output system 100 including the speaker 170, the light output units 135 and 130, the processor 110 to cause first audio and second audio to be output from the speaker 170 and cause the light output units 135 and 130 to output light corresponding to the second audio output is provided.

Preferably, the light output system 100 further includes the display 130. The processor 110 causes the display 130 to display video corresponding to at least one of the first audio and the second audio.

Preferably, the processor 110 causes light to be output in the vicinity of the light output unit 135 of the display 130 in accordance with light to be output from the light output unit 135.

Preferably, the processor 110 causes the display 130 to display video corresponding to the first audio and video corresponding to the second audio side by side.

Preferably, the light output unit 135 is a part or the whole of the display 130.

Preferably, the second audio is sub-audio or translation audio.

Preferably, the second audio includes information about a next program.

Preferably, the light output system 100X further includes the communication interface 160 to communicate with another electrical device 100Y or server. The second audio includes information from the other electric device 100Y or server.

Preferably, the light output system 100 further includes the communication interface 160 to communicate with the other electric device 100Y or server. The processor 110 sets a color of light to be output from the light output unit 135 based on information from the other electric device 100Y or server.

Preferably, the light output system 100 further includes the microphone 180. The processor 110 outputs the second audio to the speaker 170 based on audio input from the microphone 180.

Preferably, the processor 110 causes the speaker 170 to output the second audio based on acquired text.

In the embodiments described above, the television 100 including the speaker 170, the light output units 135 and 130, the processor 110 to cause first audio and second audio to be output from the speaker 170 and cause the light output units 135 and 130 to output light corresponding to the second audio output is provided.

In the embodiments described above, a method of controlling the light output system 100 that includes the speaker 170 and the light output units 135 and 130 is provided. The method includes a step of outputting first audio and second audio from the speaker 170 and a step of outputting light to the light output units 135 and 130 corresponding to the second audio output.

In the embodiments described above, a program for the light output system 100 including the speaker 170, the light output units 135 and 130, and the processor 110 is provided. The program causes the processor 110 to execute a step of outputting first audio and second audio from the speaker 170 and a step of outputting light to the light output units 135 and 130 corresponding to the second audio output.

In the embodiments described above, a computer readable recording medium storing a program for the light output system 100 including the speaker 170, the light output units 135 and 130, and the processor 110. The program causes the processor 110 to execute a step of outputting first audio and second audio from the speaker 170 and a step of outputting light to the light output units 135 and 130 corresponding to the second audio output.

It should be considered that the embodiments disclosed this time are examples in all respects and are not restrictive. The scope of the present invention is not limited to the description described above, but is indicated by the claims, and it is intended that meaning equivalent to claims and all modifications within the scope of claims are included.

REFERENCE SIGNS LIST

100 light output system
110 processor (CPU)
120 memory
121 repetition database
122 notification database
123 emotion database
124 time zone database
125 degree-of-urgency database
126 user database
127 theme database
128 timer database
130 light output unit (LED light, display)
140 operation unit
150 antenna
160 communication interface
170 speaker
180 microphone
190 GPS
195 camera
196 brightness sensor
300X external amplifier
300Y terminal
1201 operation pattern database
1202 transmission and reception amount database
1203 radio wave intensity database
1204 error database
1205 abnormality level database
1206 sound volume database
1207 brightness database
3001 interphone
3002 telephone
3003 washing machine

The invention claimed is:

1. A light output system comprising:
a speaker;
a light output unit;
a display; and
a processor to cause first audio and second audio to be output from the speaker and cause light to be output in the vicinity of a portion of the display closest to the light output unit in accordance with light to be output from the light output unit while causing the light output unit to output light corresponding to the output of the second audio, wherein
the second audio includes information about a next program.

2. The light output system according to claim 1, wherein the processor causes video corresponding to at least one of the first audio and the second audio to be displayed on the display.

3. The light output system according to claim 2, wherein the processor causes the display to output television video, and causes the speaker to output audio as the first audio for the television video while simultaneously causing the speaker to output the second audio different from the audio for the television video.

4. The light output system according to claim 2, wherein the processor causes video corresponding to the first audio and video corresponding to the second audio to be displayed on the display side by side.

5. The light output system according to claim 1, wherein the light output unit is part or whole of the display.

6. The light output system according to claim 1, wherein the second audio is sub-audio or translation audio.

7. A light output system comprising:
a speaker;
a light output unit;
a display;
a processor to cause first audio and second audio to be output from the speaker and cause light to be output in the vicinity of a portion of the display closest to the light output unit in accordance with light to be output from the light output unit while causing the light output unit to output light corresponding to the output of the second audio, and
a communication interface to communicate with another electric device or a server, wherein
the second audio includes information from the other electric device or the server.

8. The light output system according to claim 1, further comprising:
a communication interface to communicate with another electric device or a server, wherein
the processor sets a color of light to be output from the light output unit based on information from the other electric device or the server.

9. A light output system comprising:
a speaker;
a light output unit;
a display;
a processor to cause first audio and second audio to be output from the speaker and cause light to be output in the vicinity of a portion of the display closest to the light output unit in accordance with light to be output from the light output unit while causing the light output unit to output light corresponding to the output of the second audio, and
a microphone, wherein
the processor causes the speaker to output the second audio based on audio input from the microphone.

10. A light output system comprising:
a speaker;
a light output unit;
a display; and
a processor to cause first audio and second audio to be output from the speaker and cause light to be output in the vicinity of a portion of the display closest to the light output unit in accordance with light to be output from the light output unit while causing the light output unit to output light corresponding to the output of the second audio, wherein
the processor causes the speaker to output the second audio based on acquired text.

11. The light output system according to claim 1, which is a television.

* * * * *